US009129294B2

(12) United States Patent
Yahn

(10) Patent No.: US 9,129,294 B2
(45) Date of Patent: Sep. 8, 2015

(54) COIN COUNTING MACHINES HAVING COUPON CAPABILITIES, LOYALTY PROGRAM CAPABILITIES, ADVERTISING CAPABILITIES, AND THE LIKE

(75) Inventor: Gregory Yahn, Renton, WA (US)

(73) Assignee: Outerwall Inc., Bellevue, WA (US)

( * ) Notice: Subject to any disclaimer, the term of this patent is extended or adjusted under 35 U.S.C. 154(b) by 0 days.

(21) Appl. No.: 13/367,129

(22) Filed: Feb. 6, 2012

(65) Prior Publication Data
US 2013/0204688 A1    Aug. 8, 2013

(51) Int. Cl.
G06Q 30/00    (2012.01)
G06Q 30/02    (2012.01)

(52) U.S. Cl.
CPC .......... *G06Q 30/02* (2013.01); *G06Q 30/0237* (2013.01)

(58) Field of Classification Search
CPC ................................................ G06Q 30/0224
USPC .................................. 705/14.25, 14.37; 726/5
See application file for complete search history.

(56) References Cited

U.S. PATENT DOCUMENTS

| 269,461 | A | 12/1882 | Rakestraw |
| 446,303 | A | 2/1891 | Thompson |
| 545,185 | A | 8/1895 | Yost |
| 576,141 | A | 2/1897 | Muenchinger |
| 1,010,993 | A | 12/1911 | White |
| 1,234,707 | A | 7/1917 | Whistler |
| 1,345,858 | A | 7/1920 | Jenkins |
| 1,711,049 | A | 4/1929 | Fonda et al. |
| 1,813,296 | A | 7/1931 | Kidwell |
| 1,847,940 | A | 3/1932 | Giles |
| 1,945,948 | A | 2/1934 | Morin |
| 2,014,505 | A | 9/1935 | Patche |
| 2,317,351 | A | 4/1943 | Andalikiewicz et al. |
| 2,461,314 | A | 2/1949 | Davis et al. |
| 2,569,360 | A | 9/1951 | Weingart |
| 2,644,470 | A | 7/1953 | Labbe |
| 2,865,561 | A | 12/1958 | Rosapepe |
| 2,881,774 | A | 4/1959 | Labbe |
| 2,960,377 | A | 1/1960 | Simjian |
| 3,009,555 | A | 11/1961 | Seckula, Sr. |
| 3,048,251 | A | 8/1962 | Bower |

(Continued)

FOREIGN PATENT DOCUMENTS

| CA | 1053598 | 5/1979 |
| CA | 2060630 | 8/1992 |

(Continued)

OTHER PUBLICATIONS

U.S. Appl. No. 13/304,254, filed Nov. 23, 2011, Yahn, Gregory.

(Continued)

*Primary Examiner* — Hunter Wilder
(74) *Attorney, Agent, or Firm* — Perkins Coie LLP

(57) ABSTRACT

Systems and methods for providing coupons, including targeted coupons associated with, for example, loyalty programs and the like from coin counting kiosks are disclosed herein. In one embodiment, a method for providing a coupon includes receiving coins from a consumer and counting the coins to determine a value. The method further includes providing a voucher to the consumer that is redeemable for cash and/or merchandise. The method can further include providing a coupon to the consumer that is based at least in part on prior purchase information associated with the consumer.

15 Claims, 8 Drawing Sheets

(56) References Cited

U.S. PATENT DOCUMENTS

| | | |
|---|---|---|
| 3,056,132 A | 9/1962 | Simjian |
| 3,065,467 A | 11/1962 | Prevost |
| 3,132,654 A | 5/1964 | Adams |
| 3,173,742 A | 3/1965 | Simjian |
| 3,196,257 A | 7/1965 | Buchholtz et al. |
| 3,227,363 A | 1/1966 | Hecker et al. |
| 3,286,805 A | 11/1966 | New |
| 3,396,737 A | 8/1968 | Picollo |
| 3,415,348 A | 12/1968 | Wahlberg |
| 3,599,771 A | 8/1971 | Hinterstocker et al. |
| 3,603,327 A | 9/1971 | Buchholz et al. |
| 3,709,145 A | 1/1973 | Williamson |
| 3,757,917 A | 9/1973 | Waiwood et al. |
| 3,763,871 A | 10/1973 | Jobst et al. |
| 3,766,452 A | 10/1973 | Burpee et al. |
| 3,788,440 A | 1/1974 | Propice et al. |
| 3,791,574 A | 2/1974 | Picquot et al. |
| 3,815,717 A | 6/1974 | Arseneau |
| 3,941,226 A | 3/1976 | Drakes |
| 3,960,293 A | 6/1976 | Sweet, II et al. |
| 3,969,584 A | 7/1976 | Miller et al. |
| 3,982,620 A | 9/1976 | Kortenhaus |
| 3,984,660 A | 10/1976 | Oka et al. |
| 3,998,237 A | 12/1976 | Kressin et al. |
| 4,014,424 A | 3/1977 | Hall |
| 4,036,242 A | 7/1977 | Breitenstein et al. |
| 4,058,954 A | 11/1977 | Asami et al. |
| 4,059,122 A | 11/1977 | Kinoshita |
| 4,092,990 A | 6/1978 | Bayne |
| 4,099,722 A | 7/1978 | Rodesch et al. |
| 4,100,925 A | 7/1978 | Fukunaga et al. |
| 4,106,610 A | 8/1978 | Heiman |
| 4,124,109 A | 11/1978 | Bissell et al. |
| 4,141,372 A | 2/1979 | Gdanski et al. |
| 4,167,949 A | 9/1979 | Hashimoto et al. |
| 4,172,462 A | 10/1979 | Uchida et al. |
| 4,225,056 A | 9/1980 | Flubacker |
| 4,228,811 A | 10/1980 | Tanaka et al. |
| 4,230,213 A | 10/1980 | Spring |
| 4,249,552 A | 2/1981 | Margolin et al. |
| 4,252,250 A | 2/1981 | Toth |
| 4,266,121 A | 5/1981 | Hirose et al. |
| 4,275,751 A | 6/1981 | Bergman |
| 4,306,644 A | 12/1981 | Rockola et al. |
| 4,321,672 A | 3/1982 | Braun et al. |
| 4,322,067 A | 3/1982 | Masselin et al. |
| 4,326,620 A | 4/1982 | Felix et al. |
| 4,346,798 A | 8/1982 | Agey, III |
| 4,356,829 A | 11/1982 | Furuya et al. |
| 4,360,034 A | 11/1982 | Davila et al. |
| 4,369,442 A | 1/1983 | Werth et al. |
| 4,369,800 A | 1/1983 | Watanabe et al. |
| 4,374,557 A | 2/1983 | Sugimoto et al. |
| 4,376,442 A | 3/1983 | Gomez et al. |
| 4,380,316 A | 4/1983 | Glinka et al. |
| 4,383,540 A | 5/1983 | De Meyer et al. |
| 4,398,550 A | 8/1983 | Shireman |
| 4,412,292 A | 10/1983 | Sedam et al. |
| 4,412,607 A | 11/1983 | Collins et al. |
| 4,434,359 A | 2/1984 | Watanabe et al. |
| 4,436,103 A | 3/1984 | Dick |
| 4,442,850 A | 4/1984 | Austin et al. |
| 4,447,714 A | 5/1984 | Lundblad et al. |
| 4,503,963 A | 3/1985 | Steiner |
| 4,504,357 A | 3/1985 | Holbein et al. |
| 4,506,685 A | 3/1985 | Childers et al. |
| 4,509,122 A | 4/1985 | Agnew et al. |
| 4,509,633 A | 4/1985 | Chow |
| 4,542,817 A | 9/1985 | Paulson |
| 4,543,969 A | 10/1985 | Rasmussen |
| 4,554,446 A | 11/1985 | Murphy et al. |
| 4,555,618 A | 11/1985 | Riskin |
| 4,558,711 A | 12/1985 | Ikuta Yoshiaki et al. |
| 4,577,744 A | 3/1986 | Doucet et al. |
| 4,587,984 A | 5/1986 | Levasseur et al. |
| 4,597,487 A | 7/1986 | Crosby et al. |
| 4,598,378 A | 7/1986 | Giacomo |
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers et al. |
| 4,622,456 A | 11/1986 | Naruto et al. |
| 4,641,239 A | 2/1987 | Takesako |
| 4,672,377 A | 6/1987 | Murphy et al. |
| 4,674,055 A | 6/1987 | Ogaki et al. |
| 4,674,618 A | 6/1987 | Eglise et al. |
| 4,677,565 A | 6/1987 | Ogaki et al. |
| 4,687,119 A | 8/1987 | Juillet |
| 4,694,845 A | 9/1987 | Zay |
| 4,706,577 A | 11/1987 | Jones et al. |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe et al. |
| 4,753,625 A | 6/1988 | Okada et al. |
| 4,767,917 A | 8/1988 | Ushikubo |
| 4,775,353 A | 10/1988 | Childers et al. |
| 4,775,354 A | 10/1988 | Rasmussen et al. |
| 4,809,837 A | 3/1989 | Hayashi et al. |
| 4,814,589 A | 3/1989 | Storch et al. |
| 4,817,043 A | 3/1989 | Brown |
| 4,825,054 A | 4/1989 | Rust et al. |
| 4,831,374 A | 5/1989 | Masel |
| 4,833,308 A | 5/1989 | Humble |
| 4,882,675 A | 11/1989 | Nichtberger et al. |
| 4,883,158 A | 11/1989 | Kobayashi et al. |
| 4,884,672 A | 12/1989 | Parker |
| 4,896,791 A | 1/1990 | Smith |
| 4,898,564 A | 2/1990 | Gunn et al. |
| 4,910,672 A | 3/1990 | Off et al. |
| 4,915,205 A | 4/1990 | Reid et al. |
| 4,921,463 A | 5/1990 | Primdahl et al. |
| 4,936,436 A | 6/1990 | Keltner |
| 4,953,086 A | 8/1990 | Fukatsu et al. |
| 4,959,624 A | 9/1990 | Higgins, Jr. et al. |
| 4,963,118 A | 10/1990 | Gunn et al. |
| 4,964,495 A | 10/1990 | Rasmussen |
| 4,969,549 A | 11/1990 | Eglise et al. |
| 4,977,502 A | 12/1990 | Baker et al. |
| 4,978,322 A | 12/1990 | Paulsen |
| 4,995,848 A | 2/1991 | Goh et al. |
| 4,997,406 A | 3/1991 | Horiguchi et al. |
| 5,010,238 A | 4/1991 | Kadono et al. |
| 5,021,967 A | 6/1991 | Smith |
| 5,022,889 A | 6/1991 | Ristvedt et al. |
| 5,025,139 A | 6/1991 | Halliburton, Jr. |
| 5,027,937 A | 7/1991 | Parish et al. |
| 5,039,848 A | 8/1991 | Stoken |
| 5,040,657 A | 8/1991 | Gunn et al. |
| 5,055,657 A | 10/1991 | Miller et al. |
| 5,056,644 A | 10/1991 | Parker |
| 5,073,767 A | 12/1991 | Holmes et al. |
| 5,083,765 A | 1/1992 | Kringel |
| 5,083,814 A | 1/1992 | Guinta et al. |
| 5,088,587 A | 2/1992 | Goodrich et al. |
| 5,091,713 A | 2/1992 | Horne et al. |
| 5,098,339 A | 3/1992 | Dabrowski |
| 5,098,340 A | 3/1992 | Abe |
| 5,100,367 A | 3/1992 | Abe et al. |
| 5,106,260 A | 4/1992 | Obrecht |
| 5,111,927 A | 5/1992 | Schulze, Jr. |
| 5,114,381 A | 5/1992 | Ueda et al. |
| 5,135,433 A | 8/1992 | Watanabe et al. |
| 5,163,868 A | 11/1992 | Adams et al. |
| 5,166,502 A | 11/1992 | Rendleman et al. |
| 5,173,851 A | 12/1992 | Off et al. |
| 5,174,608 A | 12/1992 | Benardelli et al. |
| 5,183,142 A | 2/1993 | Latchinian et al. |
| 5,195,626 A | 3/1993 | Le Hong et al. |
| 5,197,588 A | 3/1993 | Furuya et al. |
| 5,201,396 A | 4/1993 | Chalabian et al. |
| 5,219,059 A | 6/1993 | Furuya et al. |
| 5,226,519 A | 7/1993 | DeWoolfson |
| 5,227,874 A | 7/1993 | Von Kohorn |

(56) References Cited

U.S. PATENT DOCUMENTS

| | | |
|---|---|---|
| 5,227,966 A | 7/1993 | Ichiba |
| 5,236,339 A | 8/1993 | Nishiumi et al. |
| 5,251,738 A | 10/1993 | Dabrowski |
| 5,252,811 A | 10/1993 | Henochowicz et al. |
| 5,265,033 A | 11/1993 | Vajk et al. |
| 5,271,628 A | 12/1993 | Okada |
| 5,290,033 A | 3/1994 | Bittner et al. |
| 5,293,981 A | 3/1994 | Abe et al. |
| 5,299,672 A | 4/1994 | Nishiumi et al. |
| 5,299,673 A | 4/1994 | Wu |
| 5,302,811 A | 4/1994 | Fukatsu et al. |
| 5,305,195 A | 4/1994 | Murphy |
| 5,316,120 A | 5/1994 | Ibarrola |
| 5,316,517 A | 5/1994 | Chiba et al. |
| 5,317,135 A | 5/1994 | Finocchio |
| 5,321,242 A | 6/1994 | Heath, Jr. |
| 5,328,014 A | 7/1994 | Nishiumi et al. |
| 5,330,041 A | 7/1994 | Dobbins et al. |
| 5,350,906 A | 9/1994 | Brody et al. |
| 5,355,988 A | 10/1994 | Shirasawa |
| 5,365,046 A | 11/1994 | Haymann |
| 5,368,286 A | 11/1994 | Horsman et al. |
| 5,374,814 A | 12/1994 | Kako et al. |
| 5,388,680 A | 2/1995 | Hird et al. |
| RE34,915 E | 4/1995 | Nichtberger et al. |
| 5,409,092 A | 4/1995 | Itako et al. |
| 5,429,222 A | 7/1995 | Delay et al. |
| 5,435,777 A | 7/1995 | Takatani et al. |
| 5,440,108 A | 8/1995 | Tran et al. |
| 5,441,139 A | 8/1995 | Abe et al. |
| 5,449,058 A | 9/1995 | Akel et al. |
| 5,457,305 A | 10/1995 | Akel et al. |
| 5,469,951 A | 11/1995 | Takemoto et al. |
| 5,479,507 A | 12/1995 | Anderson |
| 5,483,363 A | 1/1996 | Holmes et al. |
| 5,506,393 A | 4/1996 | Ziarno |
| 5,511,114 A | 4/1996 | Stimson et al. |
| 5,513,738 A | 5/1996 | Hird et al. |
| 5,531,640 A | 7/1996 | Inoue |
| 5,554,070 A | 9/1996 | Heibling |
| 5,555,497 A | 9/1996 | Helbling |
| 5,560,467 A | 10/1996 | Takemoto |
| 5,564,546 A | 10/1996 | Molbak |
| 5,564,974 A | 10/1996 | Mazur et al. |
| 5,577,959 A | 11/1996 | Takemoto et al. |
| 5,584,589 A | 12/1996 | Adkins et al. |
| 5,620,079 A | 4/1997 | Molbak |
| 5,637,845 A | 6/1997 | Kolls |
| 5,650,604 A | 7/1997 | Marcous et al. |
| 5,652,421 A | 7/1997 | Veeneman et al. |
| 5,661,285 A | 8/1997 | Elrick et al. |
| 5,663,546 A | 9/1997 | Cucinotta et al. |
| 5,665,952 A | 9/1997 | Ziarno |
| D385,488 S | 10/1997 | Smith et al. |
| 5,679,070 A | 10/1997 | Ishida et al. |
| 5,696,908 A | 12/1997 | Muehlberger et al. |
| 5,699,328 A | 12/1997 | Ishizaki et al. |
| 5,721,768 A | 2/1998 | Stimson et al. |
| 5,732,398 A | 3/1998 | Tagawa |
| 5,734,722 A | 3/1998 | Halpern et al. |
| 5,743,429 A | 4/1998 | Morofsky |
| 5,746,299 A | 5/1998 | Molbak et al. |
| 5,746,322 A | 5/1998 | LaVeine et al. |
| 5,748,908 A | 5/1998 | Yu |
| 5,777,305 A | 7/1998 | Smith et al. |
| 5,799,767 A | 9/1998 | Molbak |
| 5,835,061 A | 11/1998 | Stewart |
| 5,839,956 A | 11/1998 | Takemoto et al. |
| 5,842,916 A | 12/1998 | Gerrity et al. |
| 5,868,236 A | 2/1999 | Rademacher |
| 5,880,444 A | 3/1999 | Shibata et al. |
| 5,903,880 A | 5/1999 | Biffar |
| 5,905,810 A | 5/1999 | Jones et al. |
| 5,909,792 A | 6/1999 | Gerlier et al. |
| 5,909,793 A | 6/1999 | Beach et al. |
| 5,909,794 A | 6/1999 | Molbak et al. |
| 5,943,423 A | 8/1999 | Muftic et al. |
| 5,943,655 A | 8/1999 | Jacobson |
| 5,949,046 A | 9/1999 | Kenneth et al. |
| 5,953,504 A | 9/1999 | Sokal et al. |
| 5,956,697 A | 9/1999 | Usui |
| 5,964,830 A | 10/1999 | Durrett |
| 5,974,146 A | 10/1999 | Randle et al. |
| 5,982,918 A | 11/1999 | Mennie et al. |
| 5,988,348 A | 11/1999 | Martin et al. |
| 5,991,413 A | 11/1999 | Arditti et al. |
| 6,014,636 A | 1/2000 | Reeder |
| 6,014,646 A | 1/2000 | Vallee et al. |
| 6,017,063 A | 1/2000 | Nilssen |
| 6,021,883 A | 2/2000 | Casanova et al. |
| 6,028,920 A | 2/2000 | Carson |
| 6,047,807 A | 4/2000 | Molbak |
| 6,047,808 A | 4/2000 | Neubarth et al. |
| 6,053,807 A | 4/2000 | Metzger et al. |
| 6,068,550 A | 5/2000 | Breitholtz et al. |
| 6,081,791 A | 6/2000 | Clark |
| 6,102,248 A | 8/2000 | Yamamiya |
| 6,105,007 A | 8/2000 | Norris |
| 6,105,008 A | 8/2000 | Davis et al. |
| 6,105,009 A | 8/2000 | Cuervo |
| 6,110,044 A | 8/2000 | Molbak et al. |
| 6,116,402 A | 9/2000 | Beach et al. |
| 6,119,099 A | 9/2000 | Walker et al. |
| 6,119,945 A | 9/2000 | Muller et al. |
| 6,128,402 A | 10/2000 | Jones et al. |
| 6,129,275 A | 10/2000 | Urquhart et al. |
| 6,138,106 A | 10/2000 | Walker et al. |
| 6,144,946 A | 11/2000 | Iwamura et al. |
| 6,152,365 A | 11/2000 | Kolls |
| 6,185,545 B1 | 2/2001 | Resnick et al. |
| 6,193,155 B1 | 2/2001 | Walker et al. |
| 6,196,371 B1 | 3/2001 | Martin et al. |
| 6,227,343 B1 | 5/2001 | Neathway et al. |
| 6,230,928 B1 | 5/2001 | Hanna et al. |
| 6,233,564 B1 | 5/2001 | Schulze, Jr. |
| 6,243,687 B1 * | 6/2001 | Powell ........................ 705/14.36 |
| 6,253,955 B1 | 7/2001 | Bower |
| 6,264,545 B1 | 7/2001 | Magee et al. |
| 6,267,292 B1 | 7/2001 | Walker et al. |
| 6,269,349 B1 | 7/2001 | Aieta et al. |
| 6,289,324 B1 | 9/2001 | Kawan |
| 6,292,211 B1 | 9/2001 | Pena |
| 6,308,887 B1 | 10/2001 | Korman et al. |
| 6,318,536 B1 | 11/2001 | Korman et al. |
| 6,318,537 B1 | 11/2001 | Jones et al. |
| 6,349,972 B1 | 2/2002 | Geiger |
| 6,363,164 B1 | 3/2002 | Jones et al. |
| 6,370,240 B1 | 4/2002 | Woynoski et al. |
| 6,375,080 B1 | 4/2002 | Cremonese |
| 6,390,269 B1 | 5/2002 | Billington et al. |
| 6,401,010 B1 | 6/2002 | Takahashi |
| 6,405,182 B1 | 6/2002 | Cuervo |
| 6,415,262 B1 | 7/2002 | Walker et al. |
| 6,456,981 B1 | 9/2002 | Dejaeger et al. |
| 6,460,357 B1 | 10/2002 | Doi et al. |
| 6,484,863 B1 | 11/2002 | Molbak |
| 6,494,365 B1 | 12/2002 | Kozakai et al. |
| 6,494,776 B1 | 12/2002 | Molbak |
| 6,502,745 B1 | 1/2003 | Stimson et al. |
| 6,505,774 B1 | 1/2003 | Fulcher et al. |
| 6,536,037 B1 | 3/2003 | Guheen et al. |
| 6,554,184 B1 | 4/2003 | Amos |
| 6,575,361 B1 | 6/2003 | Graves et al. |
| 6,575,362 B1 | 6/2003 | Bator et al. |
| 6,628,934 B2 | 9/2003 | Rosenberg et al. |
| 6,637,576 B1 | 10/2003 | Jones et al. |
| 6,659,259 B2 | 12/2003 | Knox et al. |
| 6,661,910 B2 | 12/2003 | Jones et al. |
| 6,694,300 B1 | 2/2004 | Walker et al. |
| 6,704,039 B2 | 3/2004 | Pena |
| 6,705,448 B1 | 3/2004 | Steel et al. |
| 6,736,251 B2 | 5/2004 | Molbak |
| 6,745,022 B2 | 6/2004 | Knox |
| 6,748,067 B2 | 6/2004 | Malik |

(56) References Cited

U.S. PATENT DOCUMENTS

| | | |
|---|---|---|
| 6,748,101 B1 | 6/2004 | Jones et al. |
| 6,758,316 B2 | 7/2004 | Molbak |
| 6,772,146 B2 | 8/2004 | Khemlani et al. |
| 6,778,693 B2 | 8/2004 | Jones et al. |
| 6,799,084 B2 | 9/2004 | Grobler |
| 6,805,286 B2 | 10/2004 | Hilton et al. |
| 6,823,172 B1 | 11/2004 | Forrest |
| 6,829,596 B1 | 12/2004 | Frazee |
| 6,854,581 B2 | 2/2005 | Molbak |
| 6,857,562 B2 | 2/2005 | Sasaki |
| 6,896,118 B2 | 5/2005 | Jones et al. |
| 6,918,537 B2 | 7/2005 | Graves et al. |
| 6,934,529 B2 | 8/2005 | Bagoren et al. |
| 6,945,457 B1 | 9/2005 | Barcelou |
| 6,957,746 B2 | 10/2005 | Martin et al. |
| 6,960,986 B2 | 11/2005 | Asama et al. |
| 6,965,667 B2 | 11/2005 | Trabandt et al. |
| 6,973,172 B1 | 12/2005 | Bitove et al. |
| 6,973,443 B2 | 12/2005 | Drummond et al. |
| 6,976,570 B2 | 12/2005 | Molbak |
| 6,983,836 B2 | 1/2006 | Adams et al. |
| 6,999,569 B2 | 2/2006 | Risafi et al. |
| 7,014,108 B2 | 3/2006 | Sorenson et al. |
| 7,028,827 B1 | 4/2006 | Molbak et al. |
| 7,028,891 B2 | 4/2006 | O'Neal |
| 7,039,603 B2 | 5/2006 | Walker et al. |
| 7,044,330 B2 | 5/2006 | Chirnomas |
| 7,044,332 B2 | 5/2006 | Giegerich et al. |
| 7,054,842 B2 | 5/2006 | James et al. |
| 7,058,581 B1 | 6/2006 | Young |
| D524,857 S | 7/2006 | Graves et al. |
| D524,858 S | 7/2006 | Graves et al. |
| D524,859 S | 7/2006 | Graves et al. |
| 7,083,084 B2 | 8/2006 | Graves et al. |
| 7,093,761 B2 | 8/2006 | Smith et al. |
| 7,113,929 B1 | 9/2006 | Beach et al. |
| 7,128,261 B1 | 10/2006 | Henderson et al. |
| 7,131,580 B2 | 11/2006 | Molbak |
| D533,220 S | 12/2006 | Graves et al. |
| 7,149,336 B2 | 12/2006 | Jones et al. |
| 7,156,300 B1 | 1/2007 | Dentlinger |
| 7,158,662 B2 | 1/2007 | Chiles |
| 7,168,615 B2 | 1/2007 | Smith |
| 7,184,980 B2 | 2/2007 | Allen-Rouman et al. |
| 7,219,835 B2 | 5/2007 | Graves et al. |
| 7,249,054 B2 | 7/2007 | Keil |
| 7,251,626 B2 | 7/2007 | Blackson et al. |
| 7,252,226 B2 | 8/2007 | Risafi et al. |
| 7,255,268 B2 | 8/2007 | Dentlinger |
| 7,290,645 B2 | 11/2007 | Hill et al. |
| 7,292,998 B2 | 11/2007 | Graves et al. |
| 7,293,704 B2 | 11/2007 | Smith |
| 7,303,119 B2 | 12/2007 | Molbak |
| 7,311,249 B2 | 12/2007 | Smith et al. |
| 7,313,546 B2 | 12/2007 | Alarcon-Luther et al. |
| 7,328,190 B2 | 2/2008 | Smith et al. |
| 7,331,521 B2 | 2/2008 | Sorenson et al. |
| 7,333,955 B2 | 2/2008 | Graves et al. |
| RE40,186 E | 3/2008 | Walker et al. |
| 7,343,349 B2 | 3/2008 | Ranzini et al. |
| 7,346,039 B2 | 3/2008 | Oishi |
| 7,349,566 B2 | 3/2008 | Jones et al. |
| 7,356,507 B2 | 4/2008 | Bezos et al. |
| 7,370,805 B2 | 5/2008 | Smith et al. |
| 7,424,973 B2 | 9/2008 | Knox |
| 7,426,493 B2 | 9/2008 | Takeshima et al. |
| 7,437,328 B2 | 10/2008 | Graves et al. |
| 7,472,822 B2 | 1/2009 | Guest et al. |
| 7,494,048 B2 | 2/2009 | Gusler et al. |
| 7,520,374 B2 | 4/2009 | Martin et al. |
| 7,522,716 B2 | 4/2009 | Paschini |
| 7,527,193 B2 | 5/2009 | Molbak |
| 7,551,764 B2 | 6/2009 | Chiles et al. |
| 7,561,299 B2 | 7/2009 | Elarde et al. |
| 7,575,152 B2 | 8/2009 | Graves et al. |
| 7,597,251 B2 | 10/2009 | Barcelou |
| 7,597,255 B2 | 10/2009 | Deane et al. |
| 7,630,926 B2 | 12/2009 | Chakiris et al. |
| 7,634,425 B2 | 12/2009 | Satomi et al. |
| 7,647,259 B2 | 1/2010 | de Fabrega |
| 7,653,599 B2 | 1/2010 | Doran et al. |
| 7,677,565 B2 | 3/2010 | Grauzer et al. |
| 7,748,619 B2 | 7/2010 | Martin et al. |
| 7,778,456 B2 | 8/2010 | Jones et al. |
| 7,780,075 B2 | 8/2010 | Cooper et al. |
| 7,815,071 B2 | 10/2010 | Martin et al. |
| 7,865,432 B2 | 1/2011 | Doran et al. |
| 7,865,447 B2 | 1/2011 | Rosenhaft et al. |
| 7,874,478 B2 | 1/2011 | Molbak |
| 7,891,561 B2 | 2/2011 | Hanna |
| 7,904,565 B2 | 3/2011 | Holden et al. |
| 7,971,699 B2 | 7/2011 | Molbak et al. |
| 7,980,378 B2 | 7/2011 | Jones et al. |
| 7,991,386 B2 | 8/2011 | Smith et al. |
| 8,005,425 B2 | 8/2011 | Defosse et al. |
| 8,024,272 B2 | 9/2011 | Doran et al. |
| 8,028,897 B2 | 10/2011 | Cole et al. |
| 8,033,375 B2 | 10/2011 | Doran et al. |
| 8,042,732 B2 | 10/2011 | Blake et al. |
| 8,082,195 B2 | 12/2011 | Enzaldo |
| 8,083,133 B2 | 12/2011 | Seifert et al. |
| 8,103,586 B2 | 1/2012 | Doran et al. |
| 8,152,060 B2 | 4/2012 | Wolfe et al. |
| 8,152,061 B2 | 4/2012 | Wolfe et al. |
| 8,175,965 B2 | 5/2012 | Moore et al. |
| 8,229,851 B2 | 7/2012 | Doran et al. |
| 8,256,682 B2 | 9/2012 | Chakiris et al. |
| 8,321,342 B2 | 11/2012 | Marshall |
| 8,332,313 B2 | 12/2012 | Doran et al. |
| 8,336,774 B2 | 12/2012 | Crum |
| 8,340,815 B2 | 12/2012 | Peters et al. |
| 8,396,772 B2 | 3/2013 | Abifaker |
| 8,438,073 B2 | 5/2013 | White |
| 8,442,866 B2 | 5/2013 | Stone et al. |
| 8,447,650 B2 | 5/2013 | Postrel |
| 8,485,890 B2 | 7/2013 | Gagner et al. |
| 8,489,452 B1 * | 7/2013 | Warner et al. .............. 705/14.38 |
| 8,489,505 B2 | 7/2013 | Marshall |
| 8,494,956 B2 | 7/2013 | Tulluri et al. |
| 8,500,007 B2 | 8/2013 | Wolfe et al. |
| 8,515,808 B2 | 8/2013 | Postrel |
| 8,528,814 B2 | 9/2013 | Wolfe |
| 8,528,828 B2 | 9/2013 | Fleischer et al. |
| 8,533,036 B2 | 9/2013 | Shukla et al. |
| 8,533,037 B2 | 9/2013 | Postrel |
| 8,556,707 B2 | 10/2013 | Potts et al. |
| 8,566,169 B2 | 10/2013 | Bohanan et al. |
| 8,571,983 B1 | 10/2013 | Blackhurst et al. |
| 8,589,267 B2 | 11/2013 | Hurst |
| 8,589,297 B2 | 11/2013 | Enzaldo |
| 8,595,074 B2 | 11/2013 | Sharma et al. |
| 8,600,807 B1 | 12/2013 | Postrel |
| 8,602,297 B2 | 12/2013 | Wilen |
| 8,612,290 B2 | 12/2013 | Postrel |
| 8,631,999 B2 | 1/2014 | Wolfe et al. |
| 8,660,944 B2 | 2/2014 | Liu et al. |
| 8,668,146 B1 | 3/2014 | McGhie et al. |
| 8,675,840 B2 | 3/2014 | Risafi et al. |
| 8,676,672 B2 | 3/2014 | Nelsen |
| 8,701,982 B2 | 4/2014 | Yankovich et al. |
| 8,701,991 B2 | 4/2014 | Wolfe |
| 8,712,854 B1 | 4/2014 | Rafferty et al. |
| 8,725,564 B2 | 5/2014 | Postrel |
| 8,733,637 B1 | 5/2014 | Cedeno |
| 8,751,294 B2 | 6/2014 | Bhattacharya et al. |
| 2001/0011680 A1 | 8/2001 | Soltesz et al. |
| 2001/0023409 A1 | 9/2001 | Keil |
| 2001/0029484 A1 | 10/2001 | Schultz et al. |
| 2001/0051902 A1 | 12/2001 | Messner |
| 2002/0026423 A1 | 2/2002 | Maritzen et al. |
| 2002/0032605 A1 | 3/2002 | Lee |
| 2002/0040355 A1 | 4/2002 | Weiner |
| 2002/0046341 A1 | 4/2002 | Kazaks et al. |
| 2002/0065724 A1 | 5/2002 | Tsuruda |

(56) References Cited

U.S. PATENT DOCUMENTS

| | | | |
|---|---|---|---|
| 2002/0072974 A1 | 6/2002 | Pugliese et al. | |
| 2002/0082962 A1 | 6/2002 | Farris et al. | |
| 2002/0087462 A1 | 7/2002 | Seifert et al. | |
| 2002/0091603 A1 | 7/2002 | Steiger et al. | |
| 2002/0100660 A1 | 8/2002 | Stieber et al. | |
| 2002/0107738 A1 | 8/2002 | Duran | |
| 2002/0112162 A1 | 8/2002 | Cocotis et al. | |
| 2002/0147683 A1 | 10/2002 | Capobianco et al. | |
| 2002/0156676 A1 | 10/2002 | Ahrens et al. | |
| 2002/0161642 A1* | 10/2002 | Schultz et al. | 705/14 |
| 2002/0162895 A1 | 11/2002 | Neto | |
| 2002/0174235 A1 | 11/2002 | Likourezos | |
| 2002/0188511 A1 | 12/2002 | Johnson et al. | |
| 2002/0194122 A1 | 12/2002 | Knox et al. | |
| 2003/0046231 A1 | 3/2003 | Wu | |
| 2003/0046249 A1 | 3/2003 | Wu | |
| 2003/0053609 A1 | 3/2003 | Risafi et al. | |
| 2003/0081824 A1 | 5/2003 | Mennie et al. | |
| 2003/0140004 A1 | 7/2003 | O'Leary et al. | |
| 2003/0168508 A1 | 9/2003 | Daellenbach et al. | |
| 2003/0173405 A1 | 9/2003 | Wilz et al. | |
| 2003/0212636 A1 | 11/2003 | Resnick | |
| 2003/0233318 A1 | 12/2003 | King et al. | |
| 2004/0024700 A1 | 2/2004 | Petigny | |
| 2004/0039702 A1 | 2/2004 | Blair et al. | |
| 2004/0181481 A1 | 9/2004 | Carter | |
| 2005/0017502 A1 | 1/2005 | Chariker | |
| 2005/0038714 A1 | 2/2005 | Bonet et al. | |
| 2005/0038737 A1 | 2/2005 | Norris | |
| 2005/0045714 A1 | 3/2005 | Hermanussen | |
| 2005/0051619 A1 | 3/2005 | Graves et al. | |
| 2005/0080737 A1 | 4/2005 | Stein et al. | |
| 2005/0108155 A1 | 5/2005 | Gallagher et al. | |
| 2005/0144074 A1 | 6/2005 | Fredregill et al. | |
| 2005/0171902 A1 | 8/2005 | Nguyen | |
| 2005/0203835 A1 | 9/2005 | Nhaissi et al. | |
| 2005/0211768 A1 | 9/2005 | Stillman | |
| 2005/0227769 A1 | 10/2005 | Morrow et al. | |
| 2005/0278216 A1 | 12/2005 | Graves | |
| 2006/0015402 A1 | 1/2006 | Graves et al. | |
| 2006/0207856 A1 | 9/2006 | Dean et al. | |
| 2006/0217996 A1 | 9/2006 | Graves | |
| 2006/0219519 A1* | 10/2006 | Molbak et al. | 194/346 |
| 2006/0231611 A1 | 10/2006 | Chakiris et al. | |
| 2006/0259189 A1 | 11/2006 | Perlow et al. | |
| 2006/0293965 A1 | 12/2006 | Burton | |
| 2007/0005685 A1 | 1/2007 | Chau et al. | |
| 2007/0063021 A1 | 3/2007 | Chakiris et al. | |
| 2007/0094129 A1 | 4/2007 | Graves et al. | |
| 2007/0125620 A1 | 6/2007 | Sorenson et al. | |
| 2007/0162338 A1 | 7/2007 | Lawe | |
| 2008/0126211 A1 | 5/2008 | Kaufhold | |
| 2008/0132163 A1* | 6/2008 | Ilan et al. | 455/3.06 |
| 2008/0133411 A1 | 6/2008 | Jones et al. | |
| 2008/0162299 A1 | 7/2008 | Gusler et al. | |
| 2009/0239459 A1 | 9/2009 | Watts et al. | |
| 2009/0242626 A1 | 10/2009 | Jones et al. | |
| 2009/0265269 A1 | 10/2009 | Stoecker | |
| 2009/0320106 A1* | 12/2009 | Jones et al. | 726/5 |
| 2010/0063906 A1 | 3/2010 | Nelsen et al. | |
| 2010/0200653 A1 | 8/2010 | Wolfe et al. | |
| 2010/0200655 A1 | 8/2010 | Wolfe et al. | |
| 2010/0205050 A1 | 8/2010 | Wolfe et al. | |
| 2010/0217679 A1 | 8/2010 | Eckstein | |
| 2010/0299194 A1 | 11/2010 | Snyder et al. | |
| 2010/0312631 A1* | 12/2010 | Cervenka | 705/14.37 |
| 2011/0137689 A1 | 6/2011 | Chua et al. | |
| 2011/0137740 A1 | 6/2011 | Bhattacharya et al. | |
| 2011/0161151 A1* | 6/2011 | Brodie et al. | 705/14.25 |
| 2011/0238549 A1 | 9/2011 | Poon | |
| 2011/0251949 A1 | 10/2011 | Kay et al. | |
| 2011/0282784 A1 | 11/2011 | Nelsen | |
| 2011/0295705 A1 | 12/2011 | Kasmei | |
| 2012/0059736 A1 | 3/2012 | Bhattacharya et al. | |
| 2012/0109787 A1 | 5/2012 | Larrick et al. | |
| 2012/0143705 A1 | 6/2012 | Bhattacharya et al. | |
| 2012/0221405 A1 | 8/2012 | Bhattacharya et al. | |
| 2012/0221425 A1 | 8/2012 | Bhattacharya et al. | |
| 2012/0234911 A1 | 9/2012 | Yankovich et al. | |
| 2012/0234912 A1 | 9/2012 | Yankovich et al. | |
| 2012/0323787 A1 | 12/2012 | Nelsen | |
| 2013/0041768 A1 | 2/2013 | Llach | |
| 2013/0066735 A1 | 3/2013 | Llach | |
| 2013/0073459 A1 | 3/2013 | Zacarias et al. | |
| 2013/0080235 A1 | 3/2013 | Wolfe | |
| 2013/0091055 A1 | 4/2013 | Doran et al. | |
| 2013/0144732 A1 | 6/2013 | Rothschild | |
| 2013/0159130 A1 | 6/2013 | Gaur et al. | |
| 2013/0191178 A1 | 7/2013 | Thompson et al. | |
| 2013/0191202 A1 | 7/2013 | Postrel | |
| 2013/0204681 A1 | 8/2013 | Kraft et al. | |
| 2013/0204686 A1 | 8/2013 | Roberts et al. | |
| 2013/0204781 A1 | 8/2013 | Flitcroft et al. | |
| 2013/0246171 A1* | 9/2013 | Carapelli | 705/14.51 |
| 2013/0246209 A1 | 9/2013 | White | |
| 2013/0254074 A1 | 9/2013 | Joa et al. | |
| 2013/0254086 A1 | 9/2013 | Joa et al. | |
| 2013/0254106 A1 | 9/2013 | Webber et al. | |
| 2013/0268413 A1 | 10/2013 | Burr et al. | |
| 2013/0275204 A1 | 10/2013 | Wilen | |
| 2013/0297473 A1 | 11/2013 | Wolfe | |
| 2013/0304559 A1 | 11/2013 | Stone et al. | |
| 2013/0304620 A1 | 11/2013 | Bhattacharya et al. | |
| 2014/0006268 A1 | 1/2014 | Roberts et al. | |
| 2014/0012647 A1 | 1/2014 | Hecht | |
| 2014/0040118 A1 | 2/2014 | Miller | |
| 2014/0046784 A1 | 2/2014 | Prakash et al. | |
| 2014/0052525 A1 | 2/2014 | Postrel | |
| 2014/0058868 A1 | 2/2014 | Sharma et al. | |
| 2014/0081736 A1 | 3/2014 | Blackhurst et al. | |
| 2014/0095218 A1 | 4/2014 | Golembeski | |
| 2014/0100939 A1 | 4/2014 | Postrel | |
| 2014/0108196 A1 | 4/2014 | Yankovich et al. | |
| 2014/0122324 A1 | 5/2014 | Spier | |
| 2014/0122327 A1 | 5/2014 | Aleles et al. | |
| 2014/0122331 A1 | 5/2014 | Vaish et al. | |
| 2014/0136351 A1 | 5/2014 | Lennon | |
| 2014/0143089 A1 | 5/2014 | Campos et al. | |

FOREIGN PATENT DOCUMENTS

| | | |
|---|---|---|
| CA | 2067987 | 11/1992 |
| CA | 2421308 A1 | 3/2002 |
| CA | 2688210 | 12/2008 |
| CA | 2767162 | 11/2010 |
| CA | 2812660 | 4/2011 |
| CA | 2782657 | 6/2011 |
| CH | 680171 | 6/1992 |
| DE | 660354 | 5/1938 |
| DE | 2528735 | 4/1976 |
| DE | 3021327 | 12/1981 |
| DE | 3147603 | 6/1983 |
| EP | 0313294 | 4/1989 |
| EP | 0 351 217 | 1/1990 |
| EP | 0420163 | 4/1991 |
| EP | 0458610 | 11/1991 |
| EP | 0477722 | 4/1992 |
| EP | 0857579 | 8/1998 |
| EP | 0924662 | 6/1999 |
| EP | 0924664 | 6/1999 |
| EP | 0924665 | 6/1999 |
| EP | 1178448 | 2/2002 |
| EP | 1231579 | 8/2002 |
| EP | 1497775 | 1/2005 |
| EP | 2367150 | 9/2011 |
| FR | 2042254 | 2/1971 |
| FR | 2342531 | 9/1977 |
| FR | 2845189 | 4/2004 |
| GB | 958741 | 5/1964 |
| GB | 1564723 | 4/1980 |
| GB | 2095452 | 9/1982 |
| GB | 2121582 | 12/1983 |
| GB | 2153128 | 8/1985 |
| GB | 2175427 | 11/1986 |

(56) References Cited

FOREIGN PATENT DOCUMENTS

| | | |
|---|---|---|
| GB | 2186411 | 8/1987 |
| GB | 2188467 | 9/1987 |
| GB | 2198274 | 6/1988 |
| GB | 2223340 | 4/1990 |
| GB | 2223872 | 4/1990 |
| GB | 2255666 | 11/1992 |
| IE | 80670 | 11/1998 |
| JP | 1258092 | 10/1989 |
| JP | 1307891 | 12/1989 |
| JP | 281193 | 3/1990 |
| JP | 3-63795 | 3/1991 |
| JP | 392994 | 4/1991 |
| JP | 3252795 | 11/1991 |
| JP | 4315288 | 11/1992 |
| JP | 4344995 | 12/1992 |
| JP | 5249892 | 9/1993 |
| JP | 5250296 | 9/1993 |
| JP | 2006301807 A | 11/2006 |
| JP | 2007241925 A | 9/2007 |
| JP | 2007257578 A | 10/2007 |
| KR | 10-2003-0076944 | 9/2003 |
| KR | 20-0395417 | 9/2005 |
| KR | 10-2006-0106289 | 10/2006 |
| KR | 10-2009-0098609 | 9/2009 |
| KR | 10-2011-0094879 | 8/2011 |
| KR | 10-2011-0111719 | 10/2011 |
| SE | 44244 | 6/1916 |
| SE | 44247 | 10/1916 |
| SE | 50250 | 11/1919 |
| SE | 8801851 | 11/1989 |
| WO | WO-9406101 | 3/1994 |
| WO | WO-9409440 | 4/1994 |
| WO | WO-95/30215 | 11/1995 |
| WO | WO-9626508 | 8/1996 |
| WO | WO-96/30877 | 10/1996 |
| WO | WO-9825241 | 6/1998 |
| WO | WO-9836521 | 8/1998 |
| WO | WO-9900772 | 1/1999 |
| WO | WO-9928830 | 6/1999 |
| WO | WO-9950785 | 10/1999 |
| WO | WO-0010138 | 2/2000 |
| WO | WO-0011568 | 3/2000 |
| WO | WO-0025507 | 5/2000 |
| WO | WO-0075889 | 12/2000 |
| WO | WO-0139093 | 5/2001 |
| WO | WO-0142945 | 6/2001 |
| WO | WO-0159722 | 8/2001 |
| WO | WO-0191035 | 11/2001 |
| WO | WO-0207071 | 1/2002 |
| WO | WO-0209001 | 1/2002 |
| WO | WO-02/075680 | 9/2002 |
| WO | WO-03046845 | 6/2003 |
| WO | WO-03/071386 | 8/2003 |
| WO | WO-03/071387 | 8/2003 |
| WO | WO-03/071495 | 8/2003 |
| WO | WO-03/090020 | 10/2003 |
| WO | WO-2004023252 | 3/2004 |
| WO | WO-2004109464 | 12/2004 |
| WO | WO-2007098056 | 8/2007 |
| WO | WO-2010135640 | 11/2010 |
| WO | WO-2011040985 | 4/2011 |
| WO | WO-2011068602 | 6/2011 |
| WO | WO-2012125910 | 9/2012 |

OTHER PUBLICATIONS

Coupon Express Kiosk, Coupon Express Inc., "In-Store Kiosk Services", available at<http://psicoupons.com/index.php?option=com_content&view=article&id=51&Itemid=56>, published at least by Sep. 20, 2011, 2 pages.

"FAQ", Google Wallet, available at <http://www.google.com/wallet/faq.html>, published at least by Jul. 1, 2011, 5 pages.

"iPhone should be called iPod", Fury & Frost, dated Jan. 10, 2007, available at <http://furyandfrost.com/?p=395>, 2 pages.

"Isis to Introduce Mobile Commerce in Austin, Texas", Market Watch, Available at http://web.archive.org/web/20110625054828/http://www.marketwatch.com/story/isis-to-introduce-mobile-commerce-in-austin-texas-2011-06-22?reflink=MW_news_stmp, Jun. 22, 2011, 5 pages.

"Local Deals. Meet Mobile Payment", Cimbal, Available at http://www.cimbal.com/, published at least by Feb. 4, 2013, 2 pages.

"Mobile payment", Wikipedia, available at <http://en.wikipedia.org/wiki/Mobile_payment>, published at least by Nov. 1, 2011, 8 pages.

"Smartphone", Wikipedia, available at <http://en.wikipedia.org/wiki/Smartphone>, published at least by Jul. 1, 2011, 22 pages.

"Visa Announces an E-Wallet for Mobile, E-Commerce, and POS Transactions", Digital Transactions, Available at http://www.digitaltransactions.net/news/story/3041, May 11, 2011, 3 pages.

Associated Press, "Starbucks Expands Mobile Payment Format", Cleveland.com, Available at http://www.cleveland.com/business/index.ssf/2011/06/starbucks_expands_mobile_payme.html, Jun. 14, 2011, 4 pages.

Bernard, Tara Siegel, et al., "Swiping Is the Easy Part", The New York Times, Available at http://www.nytimes.com/2011/03/24/technology/24wallet.html?_r=4&hp&, Mar. 23, 2011, 4 pages.

Dovarganes, Damian, "The Technology Behind Making Mobile Payments a Reality", The New York Times, Available at http://bits.blogs.nytimes.com/2011/03/21/mobile-payments-to-become-next-frontier-in-mobile-fight/?scp=1&sq=Mobile%20Payments&st=cse, Mar. 21, 2011, 7 pages.

Efrati, Amir, et al. "Google Sets Role in Mobile Payment", Wall Street Journal, Available at http://web.archive.org/web/20110403131515/http://online.wsj.com/article/SB10001424052748703576204576226722412152678.html?KEYWORDS=Google, Mar. 28, 2011, 3 pages.

Entner, Roger, "Smartphones to Overtake Feature Phones in U.S. by 2011", Neilsen Wire, Available at http://http://blog.nielsen.com/nielsenwire/consumer/smartphones-to-overtake-feature-phones-in-u-s-by-2011/, Mar. 26, 2010, 4 pages.

Indvik, Lauren, "5 Big Trends in Mobile Commerce [Study]", Mashable, Available at http://web.archive.org/web/20120213194423/http://mashable.com/2011/06/21/mobile-commerce-trends, Jun. 21, 2011, 3 pages.

Kats, Rimma, "Redbox reaches 1.3M SMS messages during mobile promotion", Mobile Marketer, dated Jun. 6, 2011, available at <http://www.mobilemarketer.com/cms/news/messaging/10104.html>, 1 page.

King, Brett, "Visa Gets Its Wallet Sorted, or Does It?", Finextra, Available at http://www.finextra.com/community/fullblog.aspx?blogID=5411, Jun. 10, 2011, 6 pages.

Lawson, Stephen, "Sound-based system Promises NFC Now", PCWorld, Available at http://www.pcworld.com/article/230765/article.html, Jun. 20, 2011, 2 pages.

MacManus, Richard, "NFC: Never Mind Credit Cards, Pay with Your Phone", Readwrite Mobile, Available at http://readwrite.com/2010/04/01/nfc_never_mind_credit_cards_pay_with_your_phone, Apr. 1, 2010, 4 pages.

Madlmayr, G. et al. "Near Field Communication Based Mobile Payment System", University of Applied Sciences of Upper Austria, 2008, pp. 81-93.

Maisto, Michelle, AtandT, T-Mobile and Verizon Scale Back Isis NFC Plans: Report, Eweek, Available at http://www.eweek.com/print/c/a/Enterprise-Networking/ATandT-TMobile-Verizon-Scale-Back-Isis-NFC-Plans-Report-213439/, May 5, 2011, 1 page.

Montgomery, Justin, "Mobile Coupon Usage on the Rise, Driven by Hyperlocal Growth", Mobile Storm, Available at http://www.mobilestorm.com/resources/digital-marketing-blog/mobile-coupon-usage-on-the-rise-driven-by-hyperlocal-growth/, Apr. 19, 2010, 5 pages.

Pachal, Peter, U.S. Carriers Create Pay-By-Phone System, for Real This Time, PCMag.com, Available at http://www.pcmag.com/article2/0,2817,2372834,00.asp, Nov. 16, 2010, 3 pages.

Pogue, David, "A Simple Swipe on a Phone, and You're Paid", The New York Times, Available at http://www.nytimes.com/2010/09/30/technology/personaltech/30pogue.html?pagewanted=1&_r=2&emc=eta1&, Sep. 29, 2010, 3pages.

(56) References Cited

OTHER PUBLICATIONS

Tode, Chantal, "Convenience of Mobile Shopping Drives Significant Growth", Available at http://www.mobilecommercedaily.com/2011/06/17/convenience-of-mobile-shopping-is-driving-significant-growth, Mobile Commerce Daily, Jun. 17, 2011, 3 pages.
Walsh, Mark, "Lifestyle Tool: Mobile Part of Weekend Shopping", Media Post News, Available at http://web.archive.org/web/20110616190909/http://www.mediapost.com/publications/?fa=Articles.showArticle&art_aid=152393, Jun. 14, 2011, 2 pages.
Winter, Maisy, PayPal Comments on the Future Course of Mobile Commerce, The BluntBlogger, Available at http://web.archive.org/web/20110826081849/http://www.thebluntblogger.com/7737/paypal-comments-on-the-future-course-of-mobile-commerce, May 31, 2011, 2 pages.
Woyke, Elizabeth, Google Wins Mobile Payments Race with Summer Launch of 'Wallet' App, Forbes, Available at http://www.forbes.com/sites/elizabethwoyke/2011/05/26/google-wins-mobile-payments-race-with-summer-launch-of-wallet-app/, May 26, 2011, 3 pages.
International Search Report and Written Opinion for PCT Appl. No. PCT/US2013/024848, Mail Date May 24, 2013, 10 pages.
U.S. Appl. No. 14/312,393, filed Jun. 23, 2014, Friedlander.
U.S. Appl. No. 09/661,048, filed Sep. 14, 2000, Molbak.
U.S. Appl. No. 09/661,955, filed Sep. 14, 2000, Molbak.
U.S. Appl. No. 09/661,956, filed Sep. 14, 2000, Molbak.
U.S. Appl. No. 14/258,591, filed Apr. 22, 2014, Doran et al.
U.S. Appl. No. 14/145,140, filed Dec. 31, 2013, Doran et al.
1-800 Gift Certificate, http://www.800giftcertificate.com, accessed Feb. 16, 1999, 12 pages.
Accessories Brochure, Jun. 16, 2005, 3 pages.
Bedienungsanleitung CDS 500/MCC 500, 1991, 9 pages.
Business Wire, "Cash Goes In, Gift Certificate Comes Out—Coinstar Now Offering Gift Certificates Redeemable at Amazon.com With No Transaction Fee," dated Sep. 13, 2005, available at <http://companyweb/pctsrs/clg/PCT-US%2006-44111/Coinstar_adds_Amazon_PCT-US_06-44111_PRIOR_ART.pdf>, 2 pages.
Buy and Sell Gift Cards, "About Plastic Jungle", available at <https://www.plasticjungle.com/gift-cards/about-us/overview>, published at least before Nov. 3, 2010, 1 page.
Card Avenue, "Card Avenue—The First Online Gift Card Registry", available at <http://www.cardavenue.com/>, published at least by Nov. 3, 2010, 1 page.
Case-ICC Limited, "CDS Automated Receipt Giving Cash Deposit System," Date prior to Mar. 2, 2011, 3 pages.
Cash, M., "Bank blends new technology with service", *Winnepeg Free Press*, Sep. 4, 1992, 1 page.
CDS Automated receipt giving cash deposit system, Dec. 22, 2006, 3 pages.
Cohen, P., "Coinstar Turns Loose Change into iTunes Songs," Yahoo News, http://news.yahoo.com/s/macworld/20060410/tc_macworld/coinstar20060410_0, Apr. 10, 2006, pp. 1-3.
F. Zimmerman & Co., "Reference Manual Contovit/Sortovit, Perconta Money Counting and Sorting Systems", Aug. 1995, pp. I-III, 1-31, and three pages of specifications.
First USA: First USA Introduces the Gift Card: Pre-Paid Visa Card Works Better than a Gift Certificate, Business Editors, Nov. 12, 1998, 3 pages.
Fri Kopenskap articles, Mar. 18, 1988, Apr. 27, 1989 and Nov. 25, 1988, 6 pages.
Geldinstitute Literature, Mar. 1990 and Apr.-May 1992, 2 pages.
Gift Card Rescue, "Gift Card Exchange—Sell, Buy Discounted Gift Cards Online", available at <http://www.giftcardrescue.com/>, published at least before Nov. 3, 2010, 5 pages.
Gift Certificate Express, http://www.giftcertificateexpress.com, accessed Feb. 16, 1999, 10 pages.
Go Kiosk, "Self Service Gift Card Selling Solution", available at <http://www.gokiosk.net/kiosk/gokiosk/gift-card-kiosk/>, Dec. 31, 2008, 2 pages.
Hamilton, "Turning Cans into Cold Cash", *The Washington Post*, Jul. 2, 1991, pp. D1, D4, pp. 194-209.
Home Depot Gift Card, Scanned Apr. 5, 2006, 2 pages.
Kundenselbstbedienung, Dec. 22, 2006, 4 pages.
Kunderna fixar vaxeln, Praktiska, Dec. 12, 2006, 1 page.
Leitch, C., "High-tech bank counts coins," *Innovations*, Report on Business, Sep. 18, 1991, 1 page.
Llemeon, J., "Royal's Burlington drive-in bank provides customers 24-hour tellers," *Business Today, The Toronto Star*, Aug. 21, 1991, 1 page.
MonsterGiftCard.com, "Buy, Sell, and Swap Gift Cards Online at Monster Gift Card", available at <http://monstergiftcard.com/>, published at least by Nov. 3, 2010, 2 pages.
NCR, "NCR 7401 Retail Self-Service Solution," 1999, 2 pages.
NCR, "NCR 7800 Consumer Price Verifier," http://www3.ncr.com/product/retail/product/catalog/7800.shtml, accessed Mar. 18, 1999, pp. 1-2.
Oxby, M., "Royal Bank opens 'super branch'", *The Gazette Montreal*, Sep. 14, 1991, 1 page.
Reis Eurosystems Geldbearbeitungssysteme, "Test-Programme CS 3110 Selectronic coin sorting and counting machine," Jul. 1992, pp. 1-3.
Reis Eurosystems, "Operating Instructions CS 3110 Selectronic Coin Sorting and Counting Machine With Central Sensor", Jul. 1992, pp. 1-12, I-IV.
Sheehan, Michael, "Marriage of Convenience," available at <http://www.kioskbusiness.com/NovDec01/articles/article4.html>, accessed May 19, 2003, 3 pages.
Slide Changing Apparatus With Slide Jam Protection, Research Disclosure 30509, Sep. 1989, 3 pages.
Spectrum One, "Spectrum One? Network Solutions For Wireless Data Capture," <http://www.symbol.com/ST0000129.HTM>, accessed Mar. 18, 1999, pp. 1-5.
Star Gift Card Exchange, "Buy Gift Cards, Trade Gift Cards", available at <http://www.stargiftcardexchange.com/>, published at least by Nov. 3, 2010, 1 page.
Super Branch Literature, Feb. 1992, 2 pages.
swapagift.com, "Discounted Gift Cards", available at <http://www.swapagift.com>, published at least by Nov. 3, 2010, 2 pages.
Symbol Technologies, Inc., "PriceChecker System," Jan. 14, 2004, 2 pages.
Symbol Technologies, Inc., "Spectrum One? SAB-Lite?," Jan. 14, 2004, 2 pages.
SymbolSolutions, "Supermarket Buys Two Solutions for the Price of One," http://www.symbol.com/solution/017SS.HTM, accessed Mar. 18, 1999, pp. 1-3.
Tranax Technologies, Inc., "Card Dispenser," 2007, <http://www.tranax.com/products/self-service_products/accessories/index.cfm?product=carddisp>, [internet accessed on Aug. 11, 2009, 1 page.
Translated Article from Praktiskt Butiksarbete, Sep. 1992, 2 pages.
U.S. Appl. No. 14/507,636, filed Oct. 6, 2014, Yahn et al.

* cited by examiner

COIN COUNTING MACHINES HAVING COUPON CAPABILITIES, LOYALTY PROGRAM CAPABILITIES, ADVERTISING CAPABILITIES, AND THE LIKE

TECHNICAL FIELD

The following disclosure is directed generally to systems and associated methods related to coin counting machines having capabilities for providing coupons, interacting with loyalty programs, displaying advertisements, and the like.

BACKGROUND

Consumer-operated coin counting kiosks that exchange loose coins for redeemable cash vouchers and other tangible forms of value are in wide use today. Such machines can include, for example, the machines disclosed in U.S. Pat. Nos. 7,520,374, 7,874,478, 7,971,699 and 8,033,375, each of which is incorporated herein by reference in its entirety. Coin counting kiosks located in retail locations can increase customer traffic by providing customers a service that may not be available at other locations. Increased customer traffic can provide a corresponding increase in sales. Cash vouchers from coin counting kiosks can be more easily spent than loose coins that require a cashier to manually count the coins. Accordingly, by providing cash vouchers, coin counting kiosks can incentivize customers to purchase items while they are at the retail location, and/or purchase more items than they had initially planned on purchasing. Increasing the likelihood that a consumer will purchase items in the retail location can increase the profitability of the coin counting kiosk.

DETAILED DESCRIPTION

Figure 1:
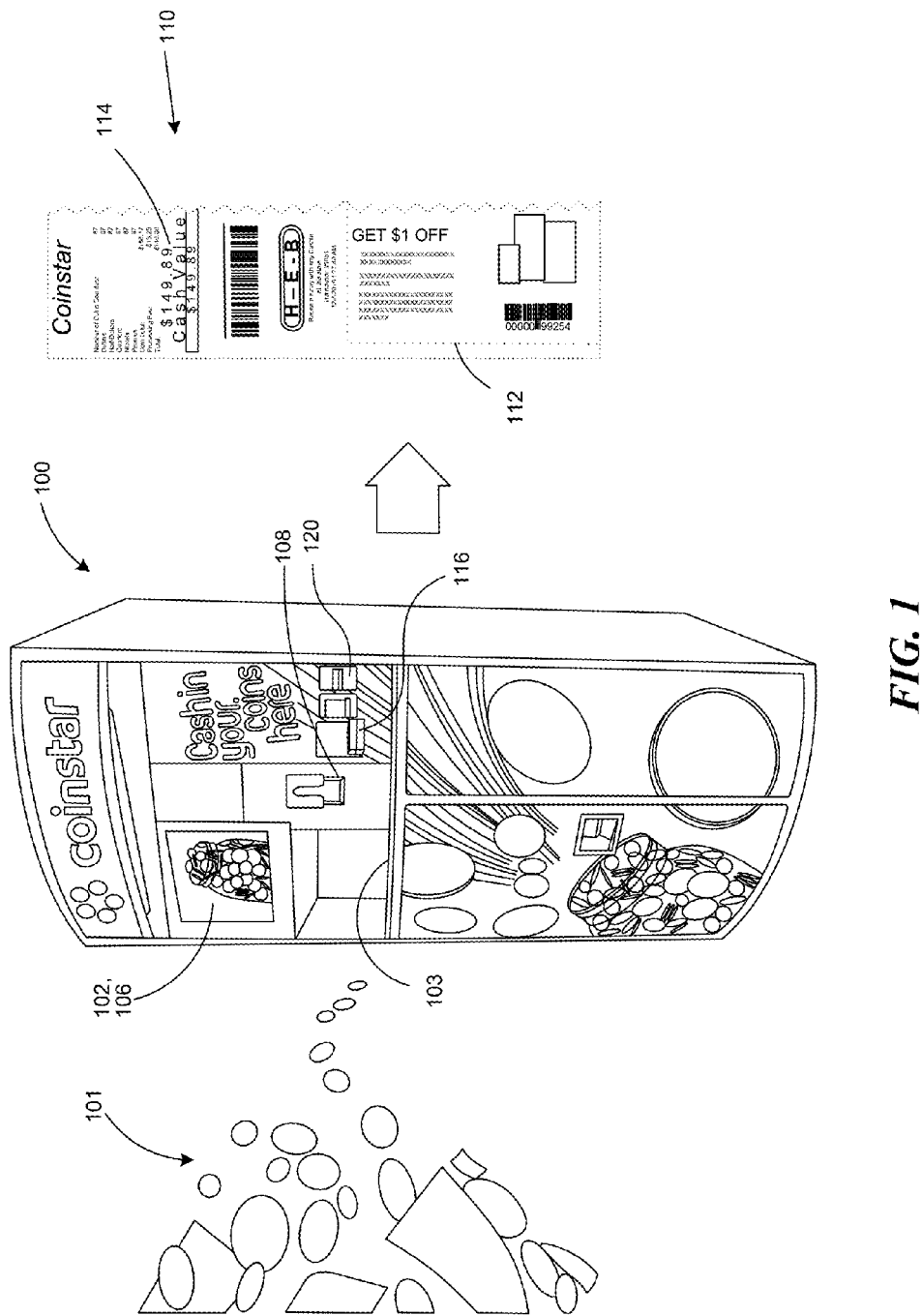
FIG. 1 is a schematic diagram illustrating several features of a coin counting kiosk configured in accordance with embodiments of the present disclosure.

The following disclosure describes various embodiments of systems and methods for providing coupons, product offers, award points, and/or other consumer directed retail incentives or advertisements via a coin counting machine or other type of consumer-operated kiosk. In some embodiments, a coin counting machine can identify a particular consumer and deliver targeted incentives or offers to the consumer. For example, a particular embodiment can include a card reader for identifying a consumer via a retailer provided loyalty card. In other embodiments, a coin counting kiosk can include a wireless communication device or near field communication (NFC) device to identify a mobile device (e.g., a smart phone) or other consumer affiliated item having a corresponding communication capability. Embodiments of the present disclosure can include coin counting machines or kiosks having features generally similar in structure and function to those described in U.S. patent application Ser. No. 13/304,254, filed Nov. 23, 2011, and entitled "MOBILE COMMERCE PLATFORMS AND ASSOCIATED SYSTEMS AND METHODS FOR CONVERTING CONSUMER COINS, CASH, AND/OR OTHER FORMS OF VALUE FOR USE WITH SAME," the entirety of which is incorporated herein by reference.

In various embodiments, a consumer operated kiosk is configured to receive loose coins and/or cash from a consumer and count the coins and/or cash to determine a total value. The consumer can then select (via, e.g., a touch screen or other suitable input device) whether to have all or a portion of the value dispensed via a voucher, gift card, e-certificate, etc., and/or transferred to a mobile device (as described in, e.g., U.S. patent application Ser. No. 13/304,254). The kiosk or coin counting machine can be located in a supermarket, grocery store, or other retail store, and the voucher can be redeemed for cash at a checkout counter or other location.

As described in detail below, in several embodiments kiosks configured in accordance with the present disclosure can provide the consumer with one or more coupons as part of a transaction. Consumer transactions with coin counting machines often occur prior to the consumer selecting products at the retail location. Compared to traditional coupon distribution methods (e.g., direct mail, newspaper advertisements, etc.), providing a coupon to the consumer at the beginning of the retail experience can increase the likelihood that the consumer will make a purchase of an associated product. In several embodiments, coupon usage can be further increased by targeting particular offers to individual consumers.

In several embodiments, the coin counting machine or kiosk can display advertising or promotional information that can be presented in a variety of different manners. In one embodiment, for example, the kiosk can include an advertising display having replaceable advertising sheets. In another embodiment, the kiosk can include a digital display that, in addition to providing coin counting or operational functionality, can provide advertisements in the form of video and/or still images. In a further embodiment, the kiosk can include a digital display dedicated to the presentation of advertisements, including video or still images. In any of these and other embodiments, the advertisements can be directed to coupons or offers available at the kiosk, and/or can be directed to general advertisements for particular products or brands associated with a consumer packaged goods (CPG) company.

Certain details are set forth in the following description and in FIGS. 1-7 to provide a thorough understanding of various embodiments of the present technology and disclosure. In other instances, well-known structures, materials, operations and/or systems often associated with coupons, advertising, loyalty cards, wireless technology, mobile devices, smart phones, commerce platforms and functionalities, are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the disclosure. Indeed, certain terms may even be emphasized below; however, any terminology intended to be interpreted in any restricted manner will be overtly and specifically defined as such in this Detailed Description section.

The accompanying Figures depict embodiments of the present technology and are not intended to limit the scope of this disclosure. Many of the details, dimensions and other features shown in the Figures are merely illustrative of particular embodiments of the disclosure. Accordingly, other embodiments can have other details, dimensions and features without departing from the spirit or scope of the present invention. For example, the sizes of various depicted elements are not necessarily drawn to scale, and various elements may be arbitrarily enlarged and/or simplified to improve legibility. Component details may be abstracted in the Figures to exclude details such as position of components and certain precise connections between such components when such details are unnecessary for a complete understanding of how to make and use the invention. Those of ordinary skill in the art will also appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 102 is first introduced and discussed with reference to FIG. 1.

FIG. 1 is schematic diagram illustrating various aspects of a system for converting coins and/or cash to a voucher and providing coupons in accordance with an embodiment of the present disclosure. The schematic diagram illustrates that coins, cash and/or other forms of currency and value 101 can be deposited in, for example, a coin input region 103 (e.g., a pivoting coin tray) or a bill receiver 120 of a consumer operated coin counting kiosk 100. The kiosk 100 can include a coin counting apparatus (not shown) for counting the deposited coins and determining a value, as disclosed in, for example, U.S. Pat. No. 7,971,699, U.S. Pat. No. 7,874,478, U.S. Pat. No. 8,033,375, U.S. Pat. No. 7,113,929, and/or U.S. patent application Ser. No. 11/294,637, each of which is incorporated herein in its entirety by reference. The kiosk 100 can also include a card reader 116 to read information from a card, e.g., a credit card, a loyalty card, etc.

Embodiments of the kiosk 100 can also include, for example, one or more output devices 108 (e.g., a visual and/or audio output device such as a display screen and speakers, respectively, a tactile output device for dispensing, for example, redeemable paper vouchers, receipts, e-certificates, card facsimiles (e.g., wallet-sized prepaid cards), a transceiver, wireless transceiver or other electronic device to transmit an electronic output, etc.), and one or more display devices 106 (e.g., a display screen, such as an LCD screen) for displaying various options and prompts to consumers and, in some embodiments, receiving user selections via an input device 102, (e.g., a touch screen, key pad, magnetic card reader, etc.; not shown in detail in FIG. 1).

In the illustrated embodiment, the kiosk 100 can provide a voucher 110 to the consumer in return for the deposited coins. The voucher 110 can include a coupon portion 112 and a cash value 114. In several embodiments, a consumer (not shown) can exchange the voucher 110 for cash, or can apply the cash value 114 to, e.g., a retail purchase. The coupon portion 112 can be used to receive a discount on a particular product, or one or more of a group of products. In the illustrated embodiment, the coupon portion 112 provides a one dollar discount on the purchase of a cereal product. In other embodiments, the coupon portion 112 can provide discounts or offers for other products or groups of products.

Figure 2:
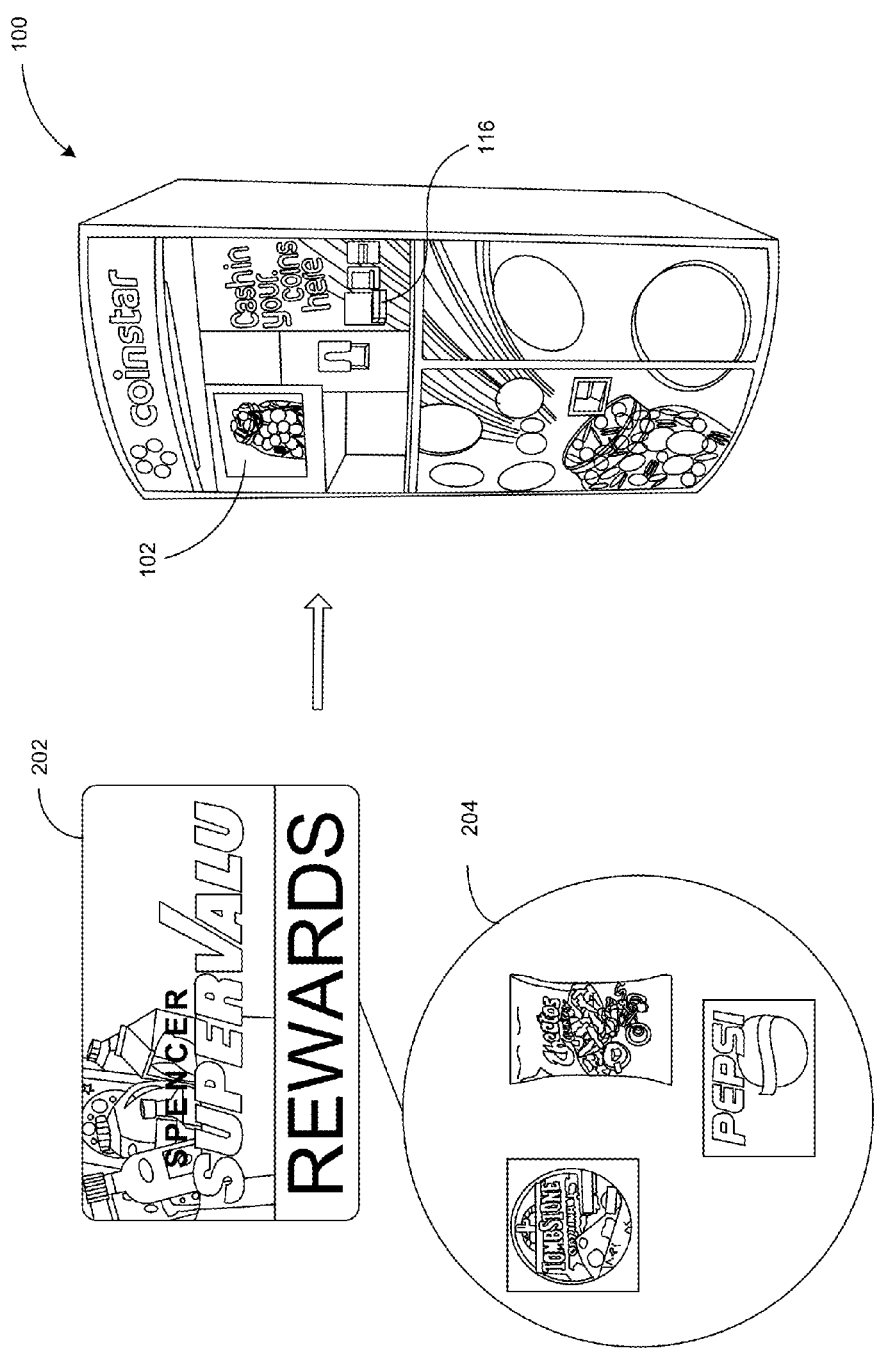
FIG. 2 is a schematic diagram illustrating interaction between a coin counting kiosk and a consumer loyalty card in accordance with an embodiment of the present disclosure.

FIG. 2 is a schematic diagram illustrating interaction between the coin counting kiosk 100 and a consumer affiliation, reward or loyalty program in accordance with an embodiment of the present disclosure. In the illustrated embodiment, a loyalty card 202 can be part of the loyalty program, and the loyalty program can involve one or more affiliated retailers or other service providers. For example, the loyalty card 202 may provide benefits (e.g., cost savings) at a particular chain of supermarkets as well as benefits related to a frequent-flyer program. The loyalty card 202 can include information that identifies a consumer as a particular member of the loyalty program and/or identifies an account or account number associated with the consumer and the loyalty program. The loyalty program can provide incentives, discounts, coupons, points and/or other benefits or rewards to consumers who identify themselves as part of the loyalty program by using the loyalty card 202 when purchasing items. In the illustrated embodiment, the loyalty card 202 identifies an account that includes or is associated with consumer purchase information in the form of purchase history data 204.

The loyalty card 202 can operate with the kiosk 100 in a variety of manners. In one embodiment, for example, the card reader 116 can read a magnetic stripe on the loyalty card 202. In another embodiment, the loyalty card 202 can include a Radio-Frequency Identification (RFID) chip and the kiosk 100 can include an RFID reader. In other embodiments, other modes of communication, including other types of near field communication (NFC), can be used to transmit information between the loyalty card 202 and the kiosk 100. In a particular embodiment, the kiosk 100 can present a request to a consumer to swipe the consumer loyalty card 202 through the card reader 116 and/or to enter identifying information associated with the loyalty card 202 via the input device 102. In other embodiments described below, the kiosk 100 can automatically identify the loyalty card 202. The purchase history data 204 provided by or associated with the loyalty card 202 can be used to generate tailored or consumer specific coupons or offers.

Figure 3:
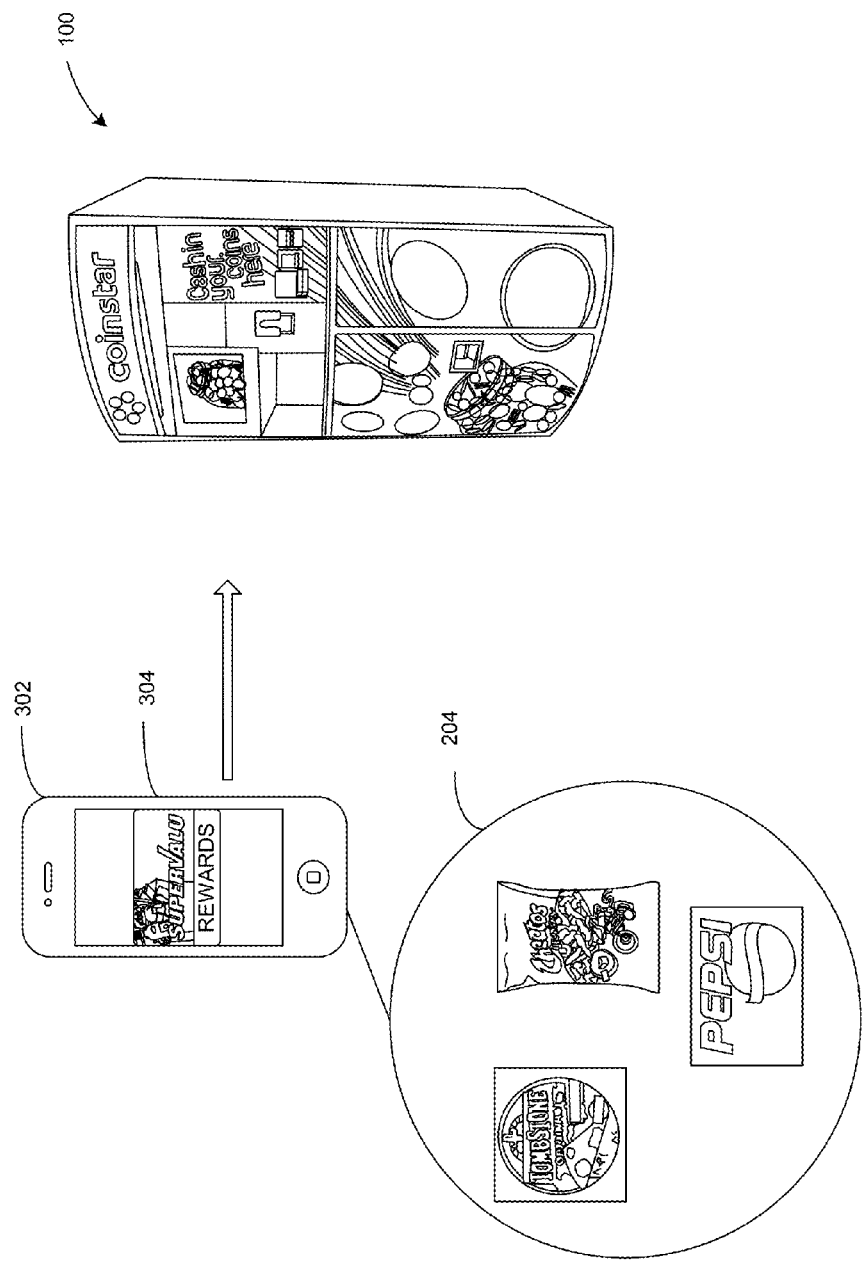
FIG. 3 is a schematic diagram illustrating interaction between a coin counting kiosk and a mobile device in accordance with embodiments of the present disclosure.

FIG. 3 is a schematic diagram illustrating a transaction between the coin counting kiosk 100 and a mobile device 302 in accordance with an embodiment of the present technology. Similar to the loyalty card transaction described above with reference to FIG. 2, in this embodiment the mobile device 302 can provide consumer purchase history information to the kiosk 100. More specifically, the mobile device 302 can implement an electronic loyalty card 304. In one embodiment, for example, the electronic loyalty card 304 can be part of a software application or "app" that can be installed on the mobile device 302. In another embodiment, the electronic loyalty card 304 can be associated with the mobile device 302, a phone number of the mobile device 302, or some other component or characteristic of the mobile device 302. For example, the mobile device 302 can include an NFC transceiver that identifies the mobile device 302 to the kiosk 100. The kiosk 100 can then determine if the mobile device 302 is associated with a particular customer or loyalty card. In some embodiments, the kiosk 100 can identify the mobile device 302 and/or the loyalty card 304 without any particular action required by the consumer. For example, the kiosk 100 can identify the mobile device 302 and/or the loyalty card 304 by using NFC to detect the proximity of an embedded or attached communication device (e.g., an RFID chip).

The purchase history data 204 can be stored in a database (e.g., a remote database; not shown), and the kiosk 100 can communicate with the mobile device 302 and/or the loyalty card 202 (FIG. 2) to receive the purchase history data 204 from the database. Additionally or alternatively, the purchase history data 204 can be stored in memory (e.g., flash memory, random access memory, etc.) on the mobile device 302 and/or the loyalty card 202 (e.g., a "smartcard"). In several embodiments, a consumer can manually enter a loyalty card number, phone number, or other identifying information directly into the kiosk 100 via a user interface, such as a keypad or touch screen. The kiosk 100 can then retrieve associated purchase history data 204 from the database after identifying the consumer via the identifying information. The kiosk 100 can connect to a wired or wireless network, or use other communication methods to retrieve remote purchase history data 204 and/or other consumer information.

Figure 4:
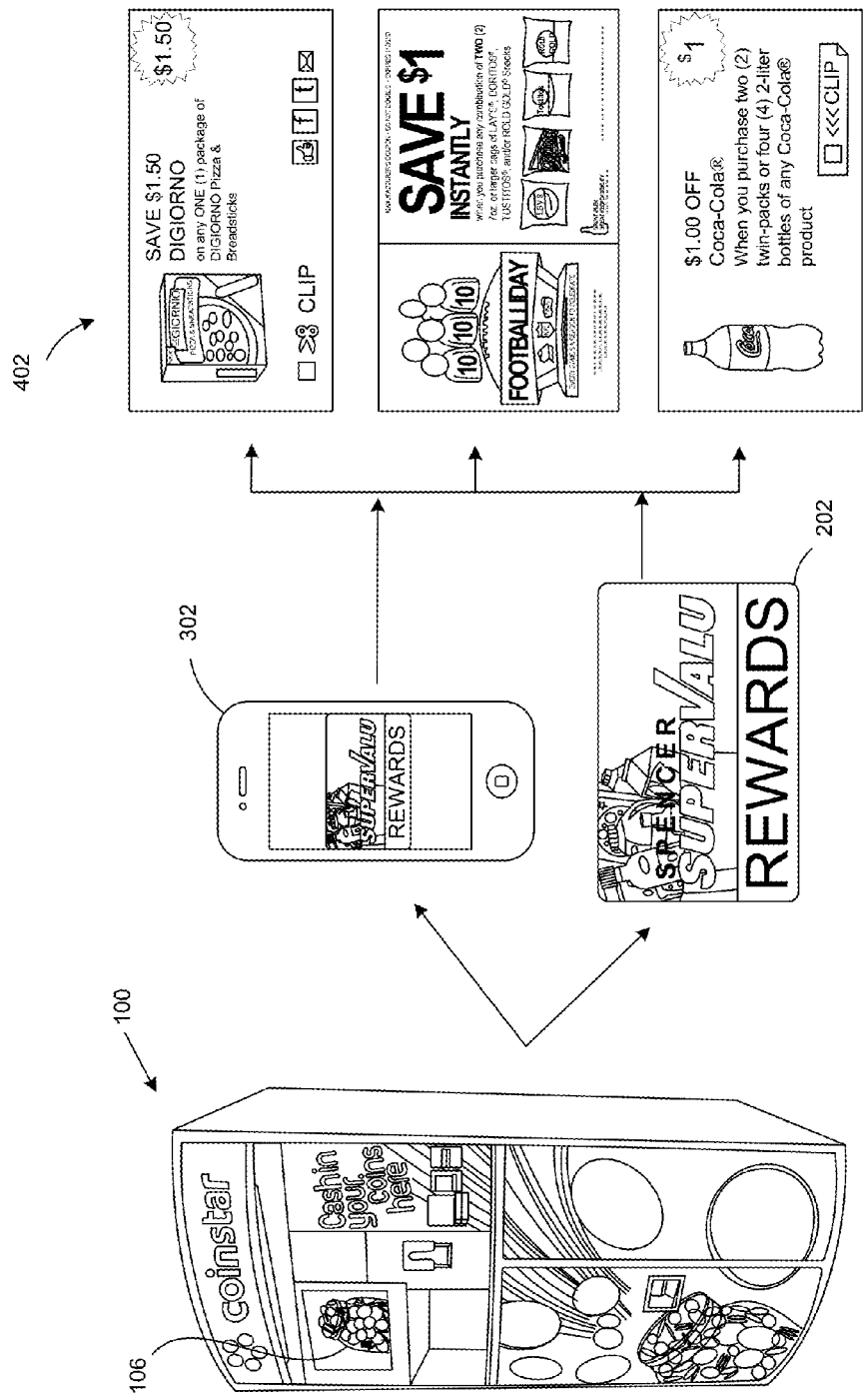
FIG. 4 is a schematic diagram illustrating coupon features of a coin counting kiosk in accordance with embodiments of the present disclosure.

FIG. 4 is a schematic diagram illustrating an output stage of a transaction with the coin counting kiosk 100 in accordance with an embodiment of the present disclosure. In the illustrated embodiment, the coin counting kiosk 100 provides targeted coupons 402 to a consumer after the consumer has input his or her loose coins and provided information to identify their loyalty program account. The targeted coupons 402 can be selected based on the consumer's purchase history data 204 (FIGS. 2 and 3) and/or other information retrieved from the consumer's loyalty program account. For example, if a consumer's purchase history demonstrates a preference for, e.g., Pepsi® (as shown in FIG. 3), a coupon for a Coca-Cola® may be provided. A retailer, CPG company, or other entity can interface with the kiosk 100 or an external computer system connected to the kiosk 100 to determine which coupons will be delivered. An algorithm that analyzes purchase history data 204 and/or other consumer information can also be used to determine which coupons will be provided. The algorithm can reside in the kiosk 100 and/or an external computer system connected to the kiosk 100.

The targeted coupons 402 can be provided in a number of different manners. In one embodiment, for example, the targeted coupons 402 can be delivered to the consumer in printed form on a physical medium (e.g., paper) similar to the coupon portion 112 described above with respect to FIG. 1. Additionally or alternatively, the targeted coupons 402 can be provided to the consumer in electronic form by uploading, or otherwise associating, the coupons 402 on/with the mobile device 302 and/or the loyalty card 202. For example, in one embodiment, the kiosk 100 can wirelessly transmit the targeted coupons 402 to the mobile device 302. In another embodiment, the kiosk 100 can connect with a network to associate the coupons 402 with the mobile device 302, an account associated with the loyalty card 202, and/or the consumer's loyalty program account. Providing the coupons 402 to the consumer in an electronic form on a device or via a card that is already in the consumer's possession affords several advantages. The consumer can receive the benefit of the coupon without having to keep track of a physical version of the coupon, the kiosk 100 does not need to be restocked with paper supplies, and waste and operating expenses are reduced.

The kiosk 100 can provide additional indications of the targeted coupons 402 available to consumers. In one embodiment, for example, the targeted coupons 402 can be displayed on the display screen 106. In some embodiments, including those where no physical coupon is provided, the display of the coupon on the screen 106 can include a notification to the consumer that the coupons have been added to an account associated with the loyalty card 202 and/or the mobile device 302. Rather than receiving a physical coupon, the notification alerts the consumer that the coupon is available via the loyalty card 202 and/or the mobile device 302 and can remind the consumer that they can receive a reduced price or other offer on a particular product or group of products that are promoted by the coupon. In some embodiments, the notification can include information on the location of the product within a retail location, information on use of the coupon and/or other related notifications or advertising. In one embodiment, the notification can include a map or other directional information that can aid the consumer in finding the product and increase the likelihood of a purchase. For example, the notification can include directions that indicate that the product is in the frozen food section of a super market.

Figure 5:
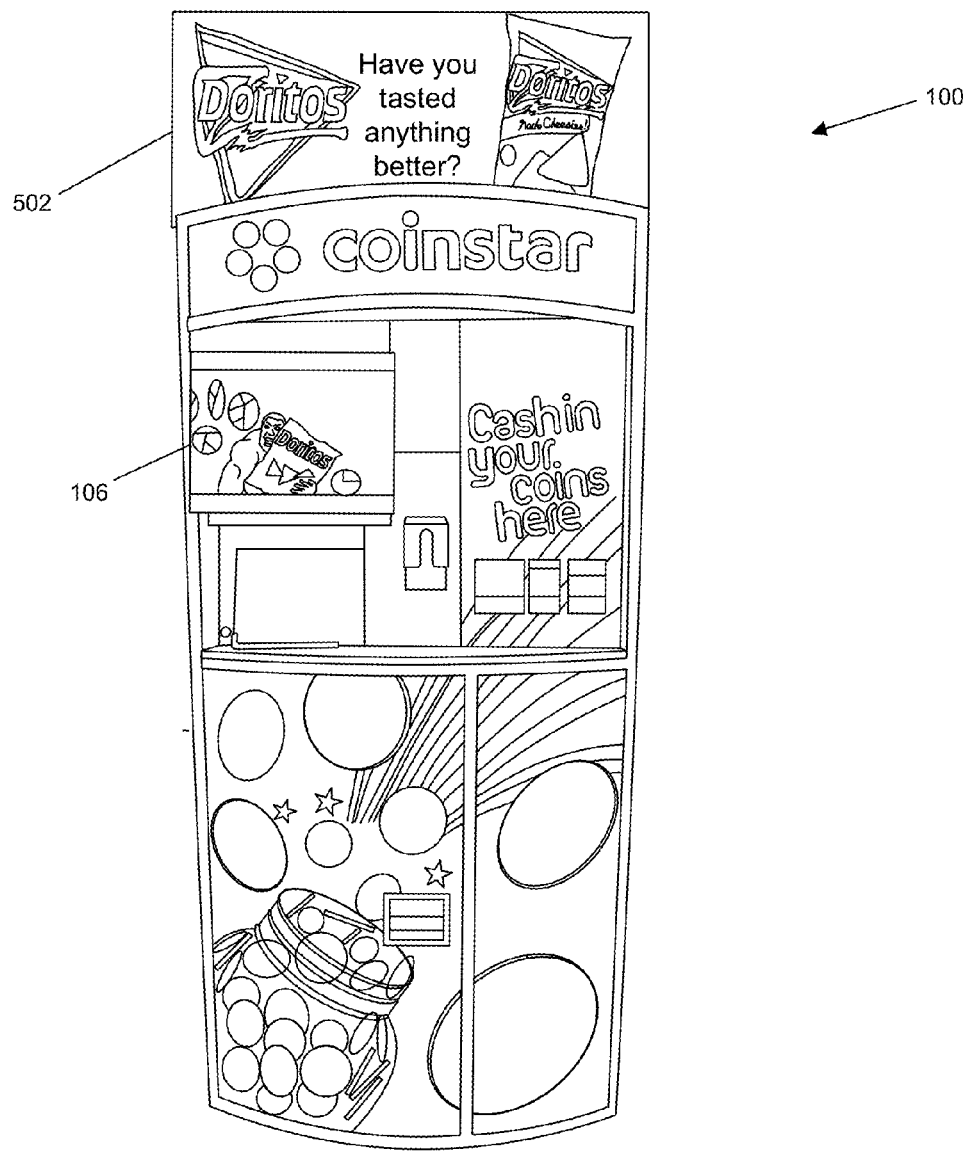
FIG. 5 is a schematic diagram of a coin counting kiosk having advertising features configured in accordance with embodiments of the present disclosure.

FIG. 5 is a schematic diagram of the coin counting kiosk 100 having advertising displays configured in accordance with a further embodiment of the present disclosure. In the illustrated embodiment, the kiosk 100 includes an advertising panel 502 positioned on the upper portion of the kiosk 100. The advertising panel 502 can include stanchions (not shown) that support a Coroplast sheet, a panel, or another medium that displays an advertisement. A retailer or other entity can place different sheets on the advertising panel 502 on a regular basis and/or as determined by an advertising agreement with a third party. In other embodiments, the advertising panel 502 can be a digital display that provides one or more advertisements. In embodiments having a digital advertising panel 502, the advertisements and/or signals controlling the display of the advertisements can be sent to the kiosk 100 from a remote location. For example, several kiosks 100 can be networked and controlled from a remote location that can update or cycle advertisements on multiple kiosks 100 independently or uniformly.

The kiosk 100 can also display advertisements on the display screen 106. The advertisements on the display screen 106 can be identical to, related to, or independent of advertisements displayed on the advertising panel 502. In addition to providing advertisements of products or groups of products, the advertising panel 502 and the display screen 106 can provide notification to consumers of coupons or other offers available at the kiosk 100. For example, the display screen 106 and/or the advertising panel 502 can provide an advertisement highlighting a product and notifying a consumer that coupons for the product are available at the kiosk 100. Additionally, the advertising panel 502 and/or the display screen 106 can display advertisements to a consumer as they utilize the kiosk 100 for coin counting or other transactions. For example, while the kiosk 100 is counting coins or providing another consumer transaction, the display screen can display a video commercial or other advertisement that promotes products and/or coupons or other offers. The provided advertisements can be tailored to the consumer based on the purchase history data 204 (FIG. 2). For example, a consumer with a purchase history including Frito-Lays products may be shown an advertisement for a Frito-Lays product (e.g., the Doritos advertisement shown in FIG. 5). Providing advertising and promoting coupon use allows the coin counting kiosk 100 to provide additional revenue streams and higher value for the space it occupies within a retail location or other location.

In several of the above described embodiments the coin counting kiosk 100 can provide general and/or targeted coupons to a consumer in conjunction with a coin counting operation. The coin counting kiosk 100 can also provide coupons to a consumer independent of a coin counting transaction. The advertising panel 502, the display screen 106 or other notification means can alert a consumer to the availability of coupons at the coin counting kiosk and inform the consumer that the coupons can be provided with or without a coin counting transaction.

Figure 6:
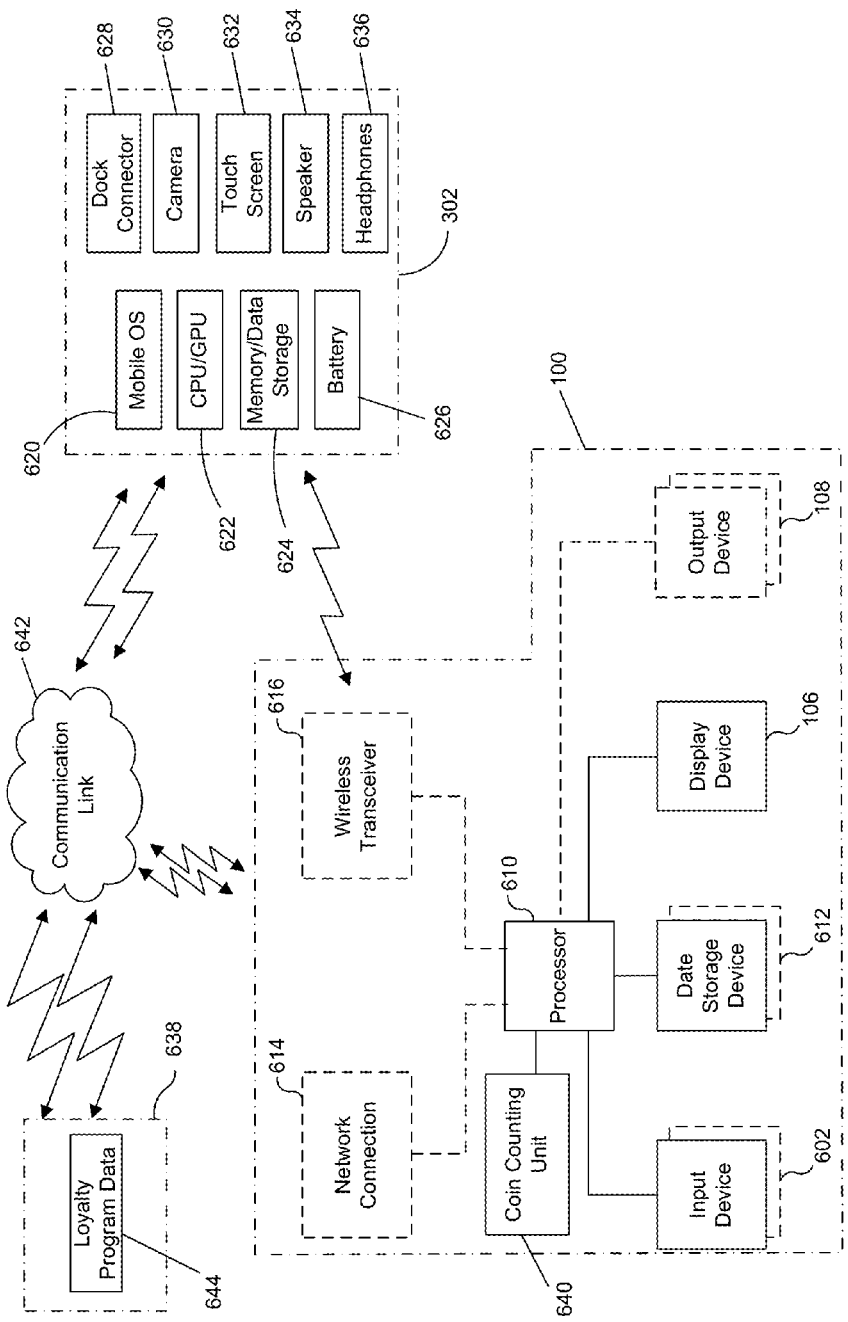
FIG. 6 is a schematic diagram illustrating various aspects of a coin counting kiosk and a mobile device suitable for implementing various coupon features, advertising features, and other features or transactions in accordance with embodiments of the present disclosure.

FIG. 6 provides schematic representations of architectures of the kiosk 100, the mobile device 302, and a remote database 638 in accordance with embodiments of the present disclosure. The remote database 638 can include loyalty program data 644, (e.g., purchase history data 204 (FIG. 2)), coupon information, reward point information, and/or other information related to the loyalty program or an account associated with the loyalty program. In the illustrated embodiments, the kiosk 100 can include a suitable network connection 614 (e.g., a wired or wireless connection, such as a wired or wireless modem, cable, etc.) for communication with the remote database, and a wireless transceiver 616, such as a transceiver suitable for wireless communication with the mobile device 302. Such communication can be performed via the communication link 642, which can include, for example, the Internet, an intranet, cell towers, the plain old telephone system (POTS), etc. The kiosk 100 can further include a suitable processor or central processing unit (CPU) 610 that controls one or more functions of the kiosk 100, including receiving information from a coin counting unit 640, the consumer input device 102, a data storage device or memory 612, the display device 106, and/or the output device 108. The CPU 610 may be any logic processing unit, such as one or more CPUs, digital signal processors (DSPs), application-specific integrated circuits (ASIC), etc. The system memory 612 can include read-only memory ("ROM") and random access memory ("RAM").

In some embodiments, the mobile device 302 can include one or more features, applications, and/or other elements commonly found in smart phones and other known mobile devices. For example, the mobile device 302 can include a central processing unit (CPU) and/or graphics processing unit (GPU) 622, for executing computer readable instructions stored on memory 624. In addition, the mobile device 302 can include an internal power source or battery 626, a dock connector 628, a camera 630, and/or well known input devices 632 including, for example, a touch screen, a keypad, etc. In many embodiments, the mobile device 302 includes a headphone connection 636, and a speaker 634 for two way communication and audio playback. In addition to the foregoing features, the mobile device 302 can also include a mobile operating system (OS) 620 for wirelessly communicating with, for example, other mobile devices, websites, and the kiosk 100.

Unless described otherwise, the construction and operation of the various blocks shown in FIG. 6 are of conventional design. As a result, such blocks need not be described in further detail herein, as they will be readily understood by those skilled in the relevant art. In other embodiments, the kiosk 100 and/or the mobile device 302 can include other features that are different from those described in detail above. In still further embodiments, the kiosk 100 and/or the mobile device 302 can include more or fewer features similar to those described above.

Figure 7:
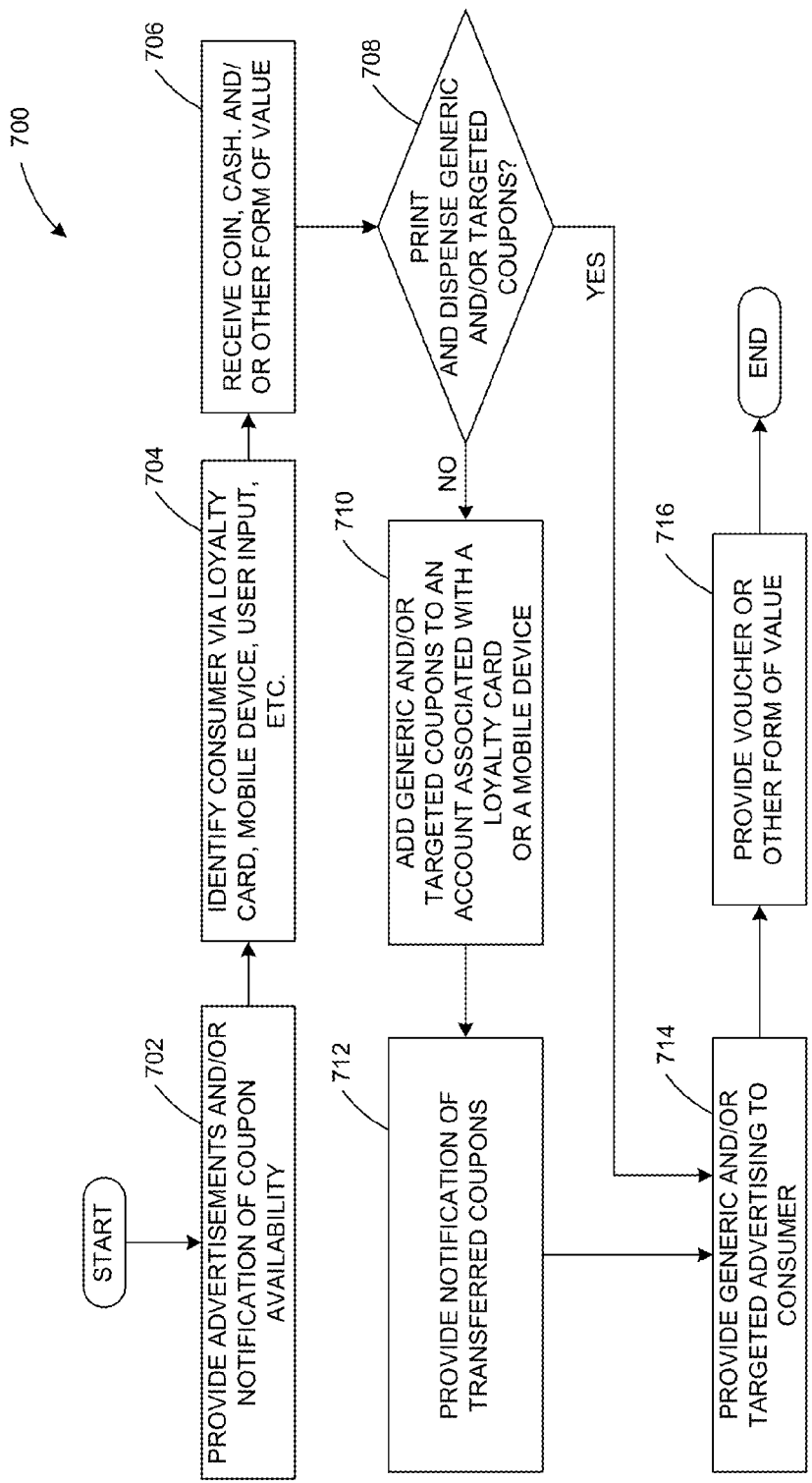
FIG. 7 is a flow diagram of a routine for providing coupons; providing advertising; and/or transferring coin value, cash value, and/or other forms of value to a voucher or other form of value in accordance with an embodiment of the present disclosure.

FIG. 7 is a representative flow diagram of a routine 700 for transferring coin value, cash value, and/or other forms of value to a voucher or other form of value and providing coupons, incentives and/or advertising in accordance with an embodiment of the present disclosure. In some embodiments, all or a portion of the routine 700 can be implemented by one or more of the devices and systems described in detail above, such as the kiosk 100, in response to suitable consumer inputs. In block 702, for example, the routine can begin with the presentation of a visual and/or audible advertisement and/or notification of coupon availability at a consumer operated kiosk (e.g., the kiosk 100 of FIG. 1) or other suitable machine for counting deposited funds to determine a value. The advertisement and/or notification can lead a consumer to interact with the kiosk 100 to engage in a coin counting transaction and/or to retrieve coupons or perform another transaction. In block 704, the kiosk 100 can identify the consumer via a consumer loyalty card 202 (FIG. 2), a mobile device 302 (FIG. 3), or user input, as described in detail above with respect to FIGS. 2 and 3. If the consumer engages in a coin counting or other transaction, the kiosk 100 can receive coin, cash and/or other forms of value from the consumer, as shown in block 706, and provide a voucher or other form of value in return, as shown in block 716. Coin counting and other transactions can involve several steps and operations, as further described in several of the U.S. Patents listed above.

In block 708 the kiosk 100 can print and dispense coupons, e.g., generic coupons and/or targeted coupons based on the consumer's purchase history. If the kiosk 100 does not print and dispense coupons, in block 710 coupons can be added to an account associated with a loyalty card 202 or a mobile device 302, as described above with respect to FIG. 4. If a coupon has been added to an account associated with the loyalty card 202 or the mobile device 302, a notification can be provided to the consumer, as shown in block 712 and described above with respect to FIG. 4. Generic and/or targeted advertising can be provided to the consumer during the routine 700, as shown in block 714 and described with respect to FIG. 5 above.

Although the steps of the routine 700 are shown in one particular order in FIG. 7, in another embodiment, one or more of the steps can be performed in a different order, continuously, and/or may not be performed at all. For example, generic advertisements may be displayed to a consumer continuously throughout the routine 700. Additionally, in other embodiments, additional steps may be added to the routine 700. For example, a consumer may transfer some or all of the coin, cash, and/or other form of value that was received in block 706 to a "mobile wallet," as described in U.S. patent application Ser. No. 13/304,254.

The flow diagram in FIG. 7 does not show all functions or operations, but instead provides an understanding of operations under various embodiments of the methods and systems described above. Those skilled in the relevant art will recognize that some functions, operations or exchange of commands and data may be repeated, varied, omitted, or supplemented, and other aspects not shown may be readily implemented. Those of ordinary skill in the art will appreciate that the routine 700 and other functions and methods described herein can be implemented as an application specific integrated circuit (ASIC), by a digital signal processing (DSP) integrated circuit, through conventional programmed logic arrays and/or circuit elements. While many of the embodiments may be implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Some steps depicted in FIG. 7 are of a type well known in the art, and can themselves include a sequence of operations that need not be described herein. Those of ordinary skill in the art can create source code, microcode, program logic arrays or otherwise implement the invention based on the flowchart and the detailed description provided herein.

Figure 8:
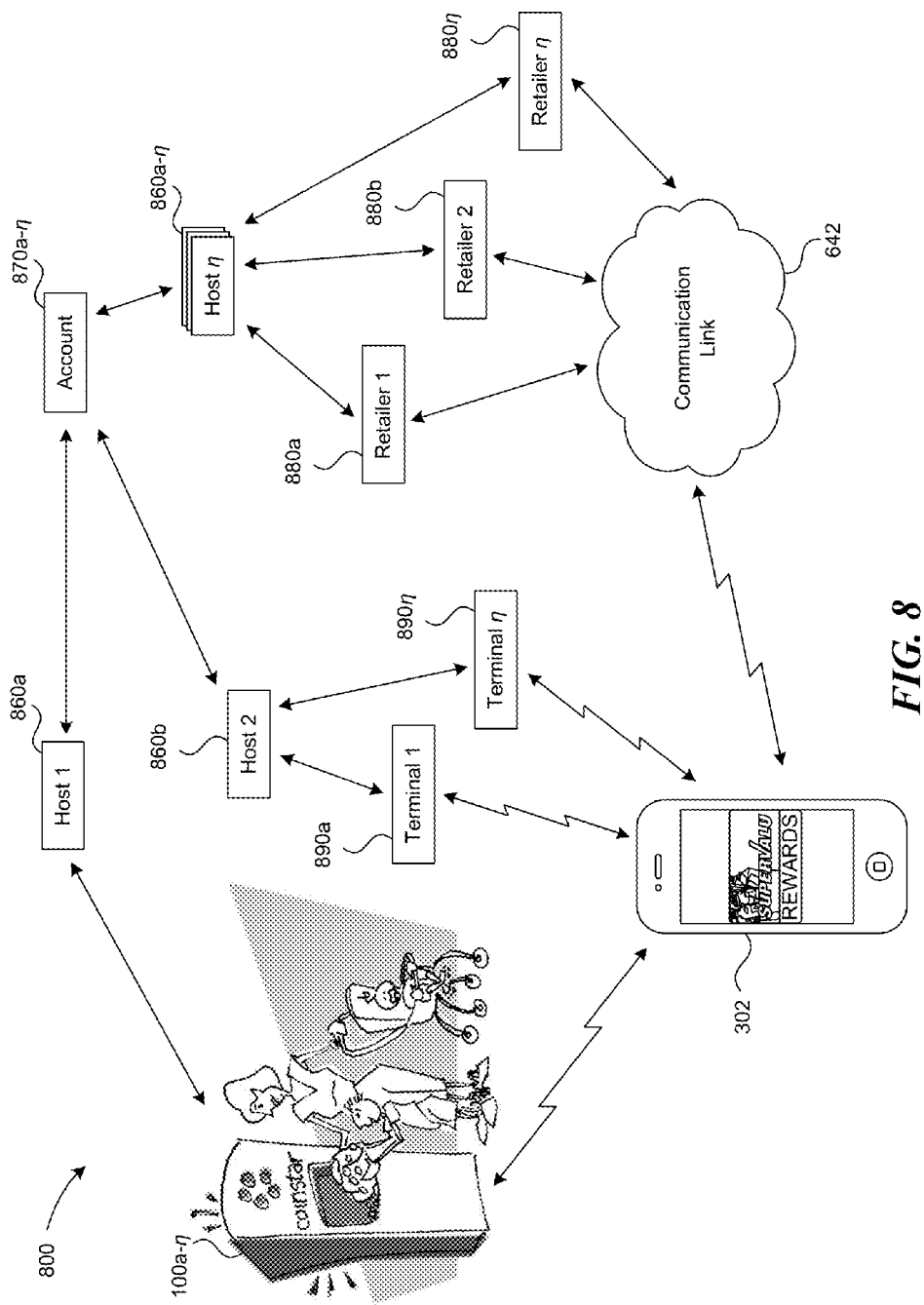
FIG. 8 is a schematic diagram of a suitable network computing environment for implementing various aspects of embodiments of the present disclosure.

FIG. 8 is a schematic diagram of a suitable network computing environment for implementing various aspects of a mobile coupon system 800 in accordance with embodiments of the present disclosure. In the illustrated embodiment, one or more consumer kiosks 100a-η (e.g., consumer coin counting kiosks) can be operably connected to a first host computer 860a via one or more communication links known in the art. Such links can include, for example, a modem, cable connections, wireless connections, etc. In the illustrated embodiment, the first host computer 860a can include a suitably configured server computer or a network of computers for exchanging information with the network of kiosks 100 and one or more loyalty program accounts 870a-η. The loyalty program accounts 870 can include various types of computer-implemented accounts that keep track of purchase history, coupons, reward point balances, frequent flyer miles, or other loyalty program information. The accounts 870 may be managed by any number of membership organizations, retailers, or other entities. In accordance with embodiments of the present disclosure, the accounts 870 can be implemented by a variety of methods, protocols, and systems, and can be implemented by one or more processing devices operably communicating with one or more databases.

In another aspect of this embodiment, each of the kiosks 100a-η can include wireless technology suitable for wireless communication between the kiosks and any number of different mobile devices, such as the mobile device 302 (e.g., a smart phone, mobile phone, tablet computer, PDA, netbook, transportable computer, etc.). For example, the kiosks 100 may connect to the mobile device 302 and/or other portions of the network directly or through other devices or connections including routers, modems, hubs, Wi-Fi connections, Wireless Personal Area Networks (WPANs), Wi-Fi PANs, wireless local area networks (WLAN), Global System for Mobile Communications (GSM), Personal Communications Service (PCS), as well as other suitable communication technology and systems known in the art.

The mobile device 302 can also be selectively linked to one or more of the accounts 870 via one or more POS terminals 890a-890η when the consumer desires to engage in a transaction at a terminal-enabled POS. The terminals 890 can include, for example, various types of wireless technology that can accommodate mobile transactions at a wide variety of retailers and merchants. In operation, the individual terminals 890 can receive loyalty program information from the mobile device 302, and provide the loyalty program information and/or related information (e.g., an account number, code or other information identifying the associated loyalty program account 870; identifying information for a purchased item(s) and/or service(s), etc.) to a corresponding second host 860b (which can comprise one or more computers), which in turn exchanges related information with the appropriate account 870 to, e.g., receive a coupon associated with a particular purchase or provide data related to reward points or other benefits. The host can provide the coupon or information associated therewith to the terminals 890 to apply a discount or other benefit to the consumer.

In various embodiments, the mobile device 302 can further include the capability to communicate (e.g., wirelessly communicate) with individual retailers and merchants 880a-880η via the communication link 642. More specifically, in some embodiments the mobile device 302 can remotely transmit information associated with a loyalty program account 870 to one of the retailers 880, to enable the consumer to use a coupon in connection with a purchase from, for example, a retailer website or from an actual POS at a retailer outlet. As with the transaction at the POS terminal 890, the information transmitted to the retailer 880 can include, for example, an account number, code or other information identifying the associated loyalty program account 870; identifying information for a purchased item(s) and/or service(s), etc. This information can then be transmitted to the appropriate account 870 via a third host 860η. As with the host computers 860a, b, the third host 860η may also comprise one or more computers or a network of computers. Coupons or other data can then be provided by the account 870 to the retailer 880 through the third host 860η to apply a discount or other benefit.

Those of ordinary skill in the art will appreciate that various aspects of the illustrated technology can be practiced with other communications, data processing, or computer system configurations including, for example, Internet appliances, handheld devices (including PDAs), wearable computers, all manner of cellular or mobile phones (including Voice over IP (VoIP) phones), dumb terminals, media players, gaming devices, multi-processor systems, multi-processor based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

As those of ordinary skill in the art will also appreciate, the network computing environment of FIG. 8 provides an overview of various aspects of a mobile coupon system 800 for implementing coupons on a mobile device in accordance with embodiments of the present technology. In other embodiments, the system 800 or similar systems for implementing mobile coupons can include more or fewer elements and/or features, or different elements and/or features than those described above. Accordingly, FIG. 8 is presented as an illustration of certain embodiments to give the reader a general understanding of the framework for implementing the present disclosure. But the present disclosure is not limited to this particular embodiment.

Those skilled in the relevant art will further appreciate that various concepts and portions of the mobile coupon system 800 can be implemented in environments other than the Internet. For example, the concepts can be used in an electronic mail environment in which electronic mail forms and messages perform various aspects of the mobile coupon system 800. Also, various communication channels may be used, such as a local area network, wide area network, or a point-to-point dial-up connection instead of the Internet.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A computer-implemented method for providing a coupon to a consumer in conjunction with an automated coin counting transaction, the method comprising:
   receiving a plurality of coins from the consumer in a coin receiving portion of a coin counting machine, the coin receiving portion including components that receive and identify values for multiple denominations of coins;
   counting the coins to determine a value;
   receiving, at the coin counting machine, loyalty account information for a loyalty program selected by the consumer from multiple potential loyalty programs provided by at least two different merchants;
   identifying the selected loyalty program, based on the received loyalty account information, wherein the identified loyalty program is provided by a specified merchant of the at least two different merchants;
   obtaining, from a host managed by the specified merchant, the coupon, wherein the coupon is selected based on a purchase history of the consumer with only the specified merchant;
   dispensing at least one of cash or a voucher to the consumer from the coin counting machine, the voucher redeemable for at least one of cash and merchandise;
   providing the coupon to the consumer at the coin counting machine, wherein the coupon is provided to the consumer in an electronic format on a mobile device; and
   notifying the consumer at the coin counting machine that the coupon has been provided to the mobile device.

2. The method of claim 1 wherein providing the coupon to the consumer includes providing the coupon to the consumer through the identified loyalty program.

3. The method of claim 1, further comprising providing electronic notification to the consumer of the availability of the coupon.

4. The method of claim 1 wherein providing the coupon to the consumer includes providing a targeted coupon to the consumer based on a preference of the consumer for a particular product identified using information from the identified loyalty program.

5. The method of claim 1, further comprising identifying the consumer as a particular member of the identified loyalty program.

6. The method of claim 5 wherein providing the coupon to the consumer includes selecting the coupon based at least in part on:
identifying a particular product or brand using the purchase history of the consumer with the specified merchant; and
selecting a coupon for a competitor product or brand of the identified product or brand.

7. The method of claim 1 wherein notifying the consumer that the coupon has been provided includes providing location information related to using the coupon.

8. The method of claim 7 wherein the location information comprises information indicating a location, within a retail location, of a product related to the coupon.

9. A computer-implemented method for providing a coupon to a consumer, the method comprising:
receiving currency from the consumer in a currency receiving portion of a coin counting kiosk, the currency receiving portion configured to receive and identify values for multiple denominations of currency items;
dispensing value to the consumer, from the coin counting kiosk, based on the received currency;
displaying a notification of the availability of coupons at the coin counting kiosk;
receiving, at the coin counting kiosk, loyalty account information for a loyalty program selected by the consumer from multiple loyalty programs, wherein at least a first of the multiple loyalty programs is provided by a first merchant and at least a second of the multiple loyalty programs is provided by a second merchant different from the first merchant;
identifying the selected loyalty program, based on the received loyalty account information, wherein the identified loyalty program is provided by a particular merchant of the first or second merchant;
dispensing the coupon in an electronic format from the coin counting kiosk to a mobile device of the consumer, wherein the coupon is selected by a host managed by the particular merchant based on a purchase history of the consumer with only the particular merchant; and
notifying the consumer at the kiosk that the coupon has been dispensed to the mobile device.

10. The method of claim 9, further comprising receiving information from the mobile device, wherein identifying the selected loyalty program is based on the information received from the mobile device.

11. The method of claim 10 wherein receiving information from the mobile device includes wirelessly receiving the information from the mobile device.

12. A consumer-operated coin counting system configured to provide a coupon to a consumer, the coin counting system comprising:
a coin input region configured to receive a plurality of loose coins from the consumer, wherein the coin input region includes components that to receive and identify values for multiple denominations of coins;
a coin discriminator configured to count the coins to determine a total value; and
a processor configured to:
receive loyalty account information for a loyalty program selected by the consumer from multiple loyalty programs provided by at least two different merchants;
identify, based on the received loyalty account information, the selected loyalty program, wherein the identified loyalty program is provided by a specific merchant of the at least two different merchants;
receive, from a host managed by the specified merchant, the coupon, wherein the coupon is selected based on product purchasing information related to the consumer and associated with the identified loyalty program, wherein the product purchasing information is not associated with other loyalty programs of the multiple loyalty programs; and
cause the coupon to be transmitted to a mobile device of the consumer.

13. The coin counting system of claim 12 further comprising a display screen, wherein the display screen is configured to display an advertisement to the consumer.

14. The coin counting system of claim 12 further comprising a network connection wherein the processor is further configured to provide an indication of the coupon to an account associated with the identified loyalty program using the network connection.

15. The coin counting system of claim 12 wherein the processor is configured to cause the coupon to be transmitted to the mobile device of the consumer by providing instructions for the coupon to be transmitted, from a network enabled device other than the consumer-operated coin counting system, to the mobile device of the consumer.

* * * * *